United States Patent
Shimizu

(10) Patent No.: US 8,493,516 B2
(45) Date of Patent: Jul. 23, 2013

(54) LIGHT-EMITTING MODULE, ILLUMINATION DEVICE, DISPLAY DEVICE, AND TELEVISION RECEIVER

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 20 days.

(21) Appl. No.: 13/376,397

(22) PCT Filed: Mar. 15, 2010

(86) PCT No.: PCT/JP2010/054305
§ 371 (c)(1),
(2), (4) Date: Dec. 6, 2011

(87) PCT Pub. No.: WO2010/146903
PCT Pub. Date: Dec. 23, 2010

(65) Prior Publication Data
US 2012/0081619 A1    Apr. 5, 2012

(30) Foreign Application Priority Data
Jun. 15, 2009   (JP) .................. 2009-141906

(51) Int. Cl.
*H04N 3/14*    (2006.01)

(52) U.S. Cl.
USPC ...................................... 348/790; 250/201.1

(58) Field of Classification Search
USPC ....... 348/790, 791, 794; 257/88, 98; 347/230, 347/238, 241, 242, 245, 256–258; 250/201.1, 250/227.11
See application file for complete search history.

(56) References Cited

U.S. PATENT DOCUMENTS

| | | | |
|---|---|---|---|
| 8,243,139 B2 * | 8/2012 | Nagai et al. | 348/148 |
| 2001/0028344 A1 * | 10/2001 | Iwamoto et al. | 345/175 |
| 2008/0026498 A1 | 1/2008 | Tarsa et al. | |
| 2009/0034296 A1 * | 2/2009 | Saito et al. | 362/623 |
| 2009/0066877 A1 * | 3/2009 | Abe et al. | 349/62 |
| 2009/0073715 A1 * | 3/2009 | Saito et al. | 362/551 |
| 2009/0122554 A1 * | 5/2009 | Ohashi et al. | 362/296.01 |
| 2009/0168432 A1 * | 7/2009 | Ohashi et al. | 362/296.01 |
| 2011/0284914 A1 * | 11/2011 | Suzuki et al. | 257/99 |
| 2012/0274771 A1 * | 11/2012 | Nagai et al. | 348/148 |

FOREIGN PATENT DOCUMENTS

| | | |
|---|---|---|
| JP | 60-107513 U | 7/1985 |
| JP | 2000-148332 A | 5/2000 |
| JP | 2008-034806 A | 2/2008 |
| JP | 2008-041546 A | 2/2008 |
| JP | 2009-025456 A | 2/2009 |
| JP | 2009-099604 A | 5/2009 |

OTHER PUBLICATIONS

Official Communication issued in International Patent Application No. PCT/JP2010/054305, mailed on Apr. 13, 2010.

* cited by examiner

*Primary Examiner* — Paulos M Natnael
(74) *Attorney, Agent, or Firm* — Keating & Bennett, LLP

(57) ABSTRACT

An LED module (MJ) wherein among apertures (21A to 21C) and pins (11A to 11C) to engage each other, the apertures (21A to 21C) are formed in a mounting board (20) and the pins (11A to 11C) are formed on a lens (10). The apertures (21A to 21C) and the pins (11A to 11C) regulate the directivity direction of the lens (10) to a specific direction by engaging each other in one kind of manner.

13 Claims, 21 Drawing Sheets

EX1

EX1

EX1

EX1

EX1

EX1

EX1

EX1

EX1

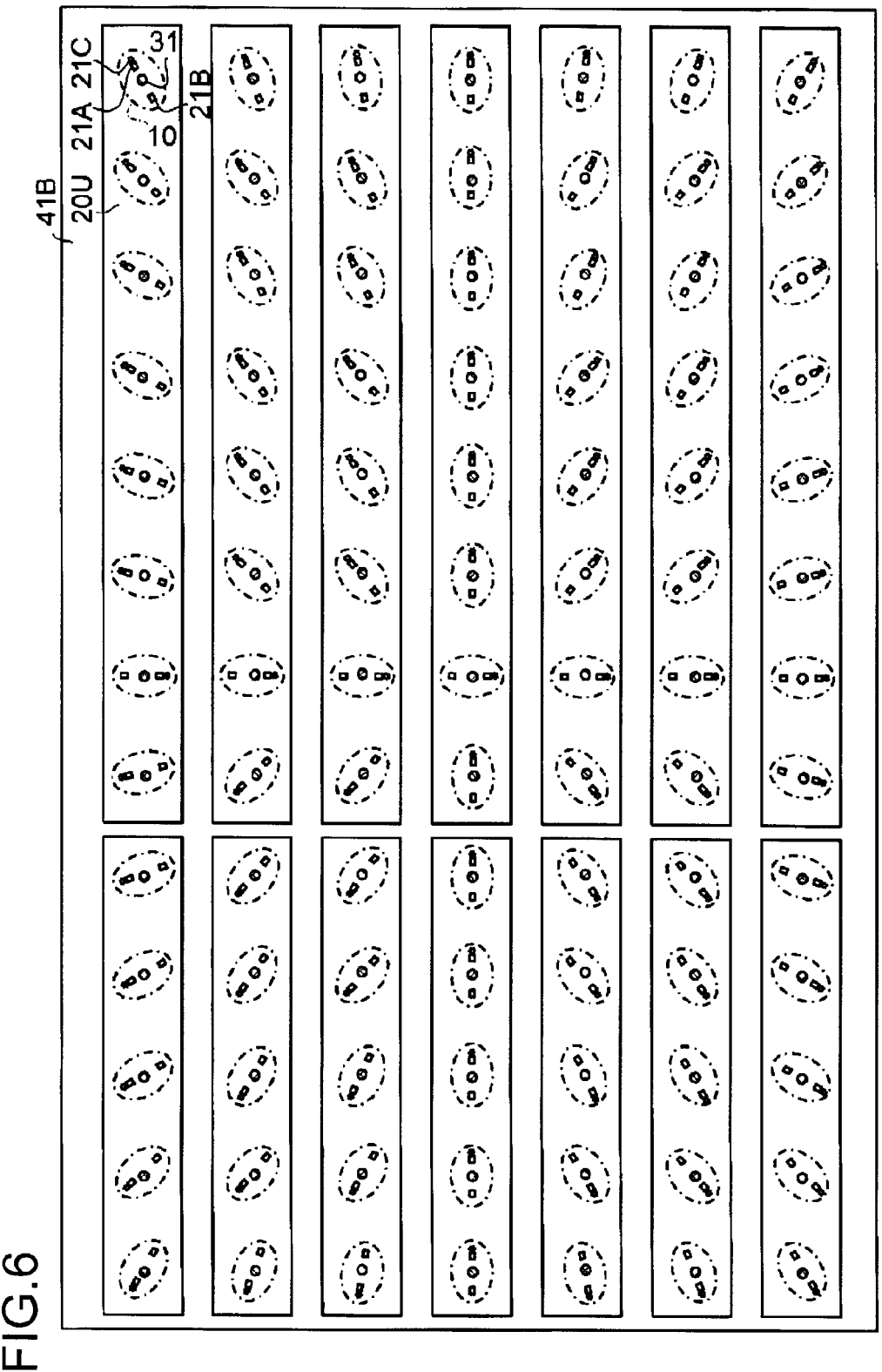

EX2

EX2

EX2

EX2

EX2

EX2

EX2

EX2

EX3

EX3

EX3

EX4

EX4

EX4

EX4

EX4

EX4

EX4

EX4

EX5

EX5

EX5

LIGHT-EMITTING MODULE, ILLUMINATION DEVICE, DISPLAY DEVICE, AND TELEVISION RECEIVER

TECHNICAL FIELD

The present invention relates to a light-emitting module that includes a light source like a light-emitting element, an illumination device that employs the light-emitting module, a display device that incorporates the illumination device, and further a television receiver that incorporates the display device.

BACKGROUND ART

In a liquid crystal display device (display device) that incorporates a non-light-emitting liquid crystal display panel (display panel), usually, also a backlight unit (illumination device), which supplies light to the liquid crystal display panel, is incorporated. There are various kinds of light sources for the backlight unit. For example, in a case of the backlight unit disclosed in a patent document 1, the light source is an LED (Light Emitting Diode).

In this backlight unit, as shown in FIG. 20, a lens 110, which diffuses light from an LED mounted on a mounting substrate 120, is disposed (here, a module, which includes the LED, the lens 110 and the mounting substrate 120, is called a light-emitting module mj).

CITATION LIST

Patent Literature

PLT1: JP-A-2000-148332

SUMMARY OF INVENTION

Technical Problem

In the meantime, if an illuminance distribution is imaged from the front of the LED module mj by means of an imaging camera, an image as shown in FIG. 21 is obtained (here, in this imaging, a diffusion plate is interposed between the imaging camera and the lens 110 and the diffusion plate is imaged.)

This image includes: a rectangular region (dotted-line region) at a central portion; regions (one-dot-one-bar line regions) at four corners; and other regions. Here, the region enclosed by the dotted line is indicated by ar1, the region enclosed by the one-dot-one-bar line is indicated by ar3, and the other regions are indicated by ar2. And, if illuminances (lumen) of these regions ar1, ar2, and ar3 are indicated by lm1, lm2, and lm3, respectively, they are in a relationship of lm1>lm2>lm3.

According to this, it is understood from this image that surface light generated by the LED module mj contains light-amount unevenness. As a way of eliminating the light-amount unevenness, there is a way of mounting, on the mounting substrate 120, a plurality of kinds of lenses 110 having different lens-surface shapes.

For example, a lens corresponding to the region ar1, a lens for guiding light to the region ar2, a lens for guiding light to the region ar3, that is, a plurality of kinds of lenses 110 having different directivities of transmitted light are preferably mounted on the mounting substrate 120. A reason for this is that according to this LED module mj, it is possible to set the directivity direction of the transmitted light to face the regions ar2 and ar3 that are likely to become dark areas and to eliminate the dark areas.

However, in this LED module mj, the number of kinds of the lens 110 increases, which causes the production cost to increase. Besides, for every kind of the lens 110, a mount position is decided on the mounting substrate 120; accordingly, a long time is required to identify the mount position and the production time of the LED module mj cannot avoid becoming long (in short, the positioning of the lens 110 is onerous).

The present invention has been made to solve the above problems. And, it is an object of the present invention to provide a light-emitting module and the like that curb increase in lens kind and achieve reduction in production burden.

Solution to Problem

The light-emitting module includes: a light-emitting element; a mounting substrate on which the light-emitting element is mounted; and a lens that receives light from the light-emitting element and outputs the light. And, there is a case where in the light-emitting module, the lens outputs part of the light in an directivity direction that is a deflected direction. In such a case, in the light-emitting module, of a first type of restriction portion and a second type of restriction portion that engage with each other, one type is formed through the mount base portion and the other type is formed on the lens; and both types of the restriction portions, by engaging with each other in one way of engagement, restrict the directivity direction of the lens to a specific direction.

According to this, the directivity direction (e.g., the direction of the lens) of the lens is restricted by the first type of restriction portion and the second type of restriction portion that engage with each other in only one way of engagement; accordingly, the positioning of the lens becomes easy. In other words, the production of the light-emitting module becomes easy.

In addition, the direction of the lens is decided in advance by the first type of restriction portion and the second type of restriction portion; accordingly, even if the shape of a lens surface of the lens is not variously changed, the illuminance distribution (and the brightness distribution) of the light from the light-emitting module changes variously. Accordingly, for example, even only one kind of lenses are able to variously change the illuminance distribution of the light from the light-emitting module. In other words, the light-emitting module that is easy to produce is achieved while reducing the production cost by curbing the lens cost.

Here, it is desirable that the first type of restriction portion and the second type of restriction portion have shapes that are fittable in each other. A reason for this is that according to such first type of restriction portion and second type of restriction portion, the structure is simple.

Besides, instead of the one type of restriction portion formed through the mounting substrate, another member mounted on the mounting substrate may engage with the other type of restriction portion to function as the one restriction portion. A reason for this is that because compared with forming the restriction portion through the mounting substrate, using another member is sometimes able to curb the cost of the light-emitting module.

Here, the number of the first type of restriction portions and the number of the second type restriction portions may be the same as each other and a single, or may the same as each other and more than one. According to this, in accordance with the cost of both types of restriction portions, the degree of freedom of designing the light-emitting module increases.

Besides, when a plurality of kinds of the lenses that have directivity direction s different from each other are used; it is desirable that for different kinds of lenses, different kinds of one type of restriction portions are formed, and in accordance with the different kinds, different kinds of the other type of restriction portions as well are formed.

According to this, on the mounting substrate, mis-positioning of the different kinds of lenses is solved.

Besides, when the same kind of lenses that have the same directivity direction s as each other are used; it is desirable that the kinds of the one type of restriction portions formed on all the lenses are single, and in accordance with the single kind, the kinds of the other type of restriction portions also are single.

A reason for this is that according to this, only one kind of lenses are incorporated in the light-emitting module; accordingly, the cost of the light-emitting module is surely curbed.

Here, an illumination device, which includes the above-described light-emitting module, also is sayable to be the present invention; and a display device, which includes the illumination device and a display panel (e.g., a liquid crystal display panel) that receives light from the illumination device, also is sayable to be the present invention (here, as a device that incorporates the display device, there is a television receiver as an example.).

Advantageous Effects of Invention

According to the light-emitting module of the present invention, the direction of the lens is decided in advance by the first type of restriction portion and the second type of restriction portion; accordingly, even if the shape of a lens surface of the lens is not made to be variously different, the illuminance distribution of the light from the light-emitting module is changed variously; and further, the production is easy. Because of this, the cost of the lens is curbed and the cost of the light-emitting module also is curbed.

BRIEF DESCRIPTION OF DRAWINGS

[FIG. 6] is a plan view showing holes and LEDs disposed on a mounting substrate.

DESCRIPTION OF EMBODIMENTS

[Embodiment 1]

An embodiment 1 is described based on drawings as follows. Here, for convenience, there is a case where a hatching, a member reference number and the like are omitted; in such a case, other drawings are referred to. Besides, for convenience, a hatching is also sometimes applied to a view other than a sectional view.

Figure 18:
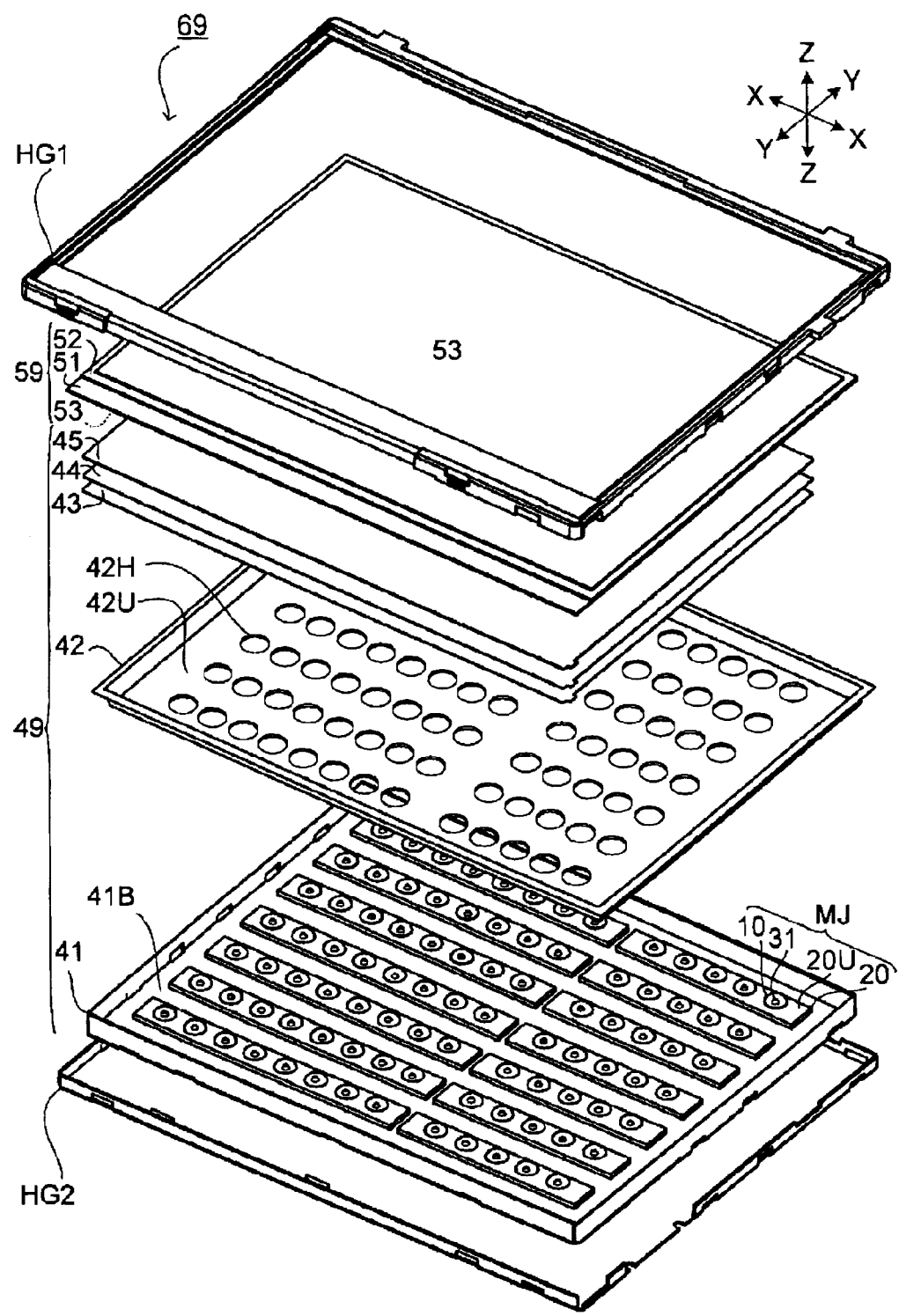
[FIG. 18] is an exploded perspective view of a liquid crystal display device.
Figure 19:
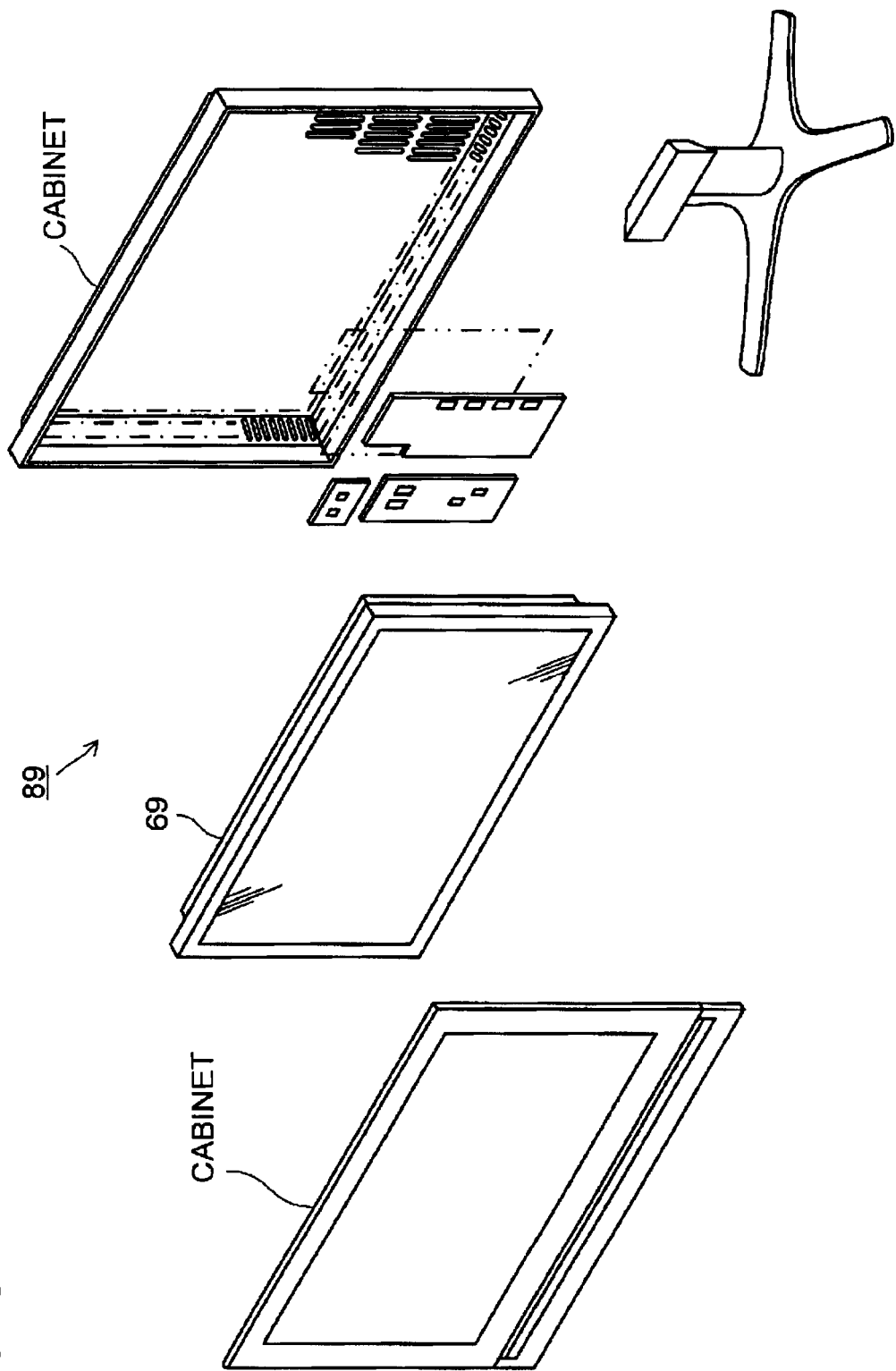
[FIG. 19] is an exploded perspective view of a liquid crystal television that incorporates a liquid crystal display device.
Figure 20:
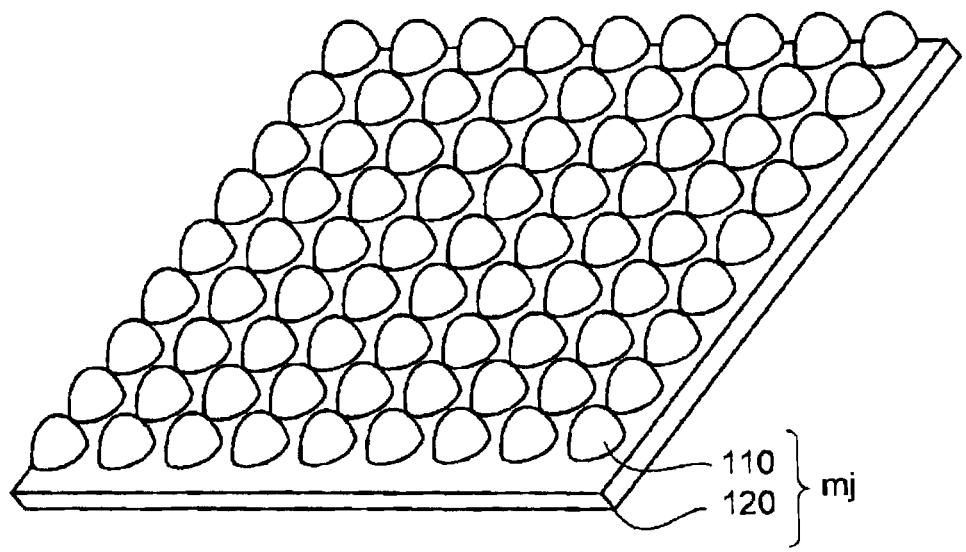
[FIG. 20] is a perspective view of a conventional LED module.
Figure 21:
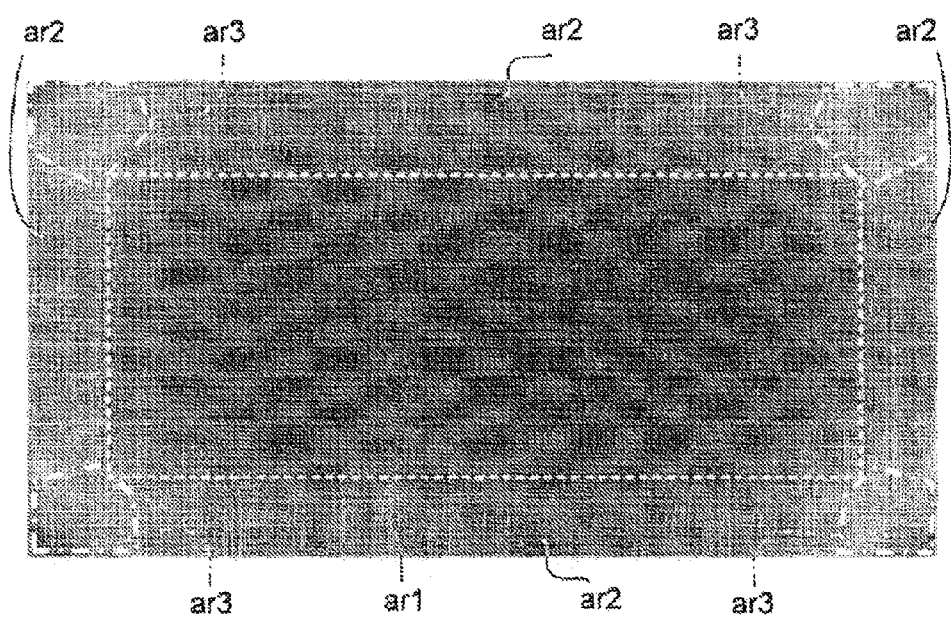
[FIG. 21] is an image showing an illumination distribution of surface light from the LED module in FIG. 20.

FIG. 19 shows a liquid crystal television 89 that incorporates a liquid crystal display device (display device). Here, this liquid crystal television 89 receives a television broadcast signal to display an image, accordingly, it is sayable to be a television receiver. FIG. 18 is an exploded perspective view showing the liquid crystal display device. As shown in this figure, the liquid crystal display device 69 includes: a liquid crystal display panel 59; a backlight unit (illumination device) 49 that supplies light to the liquid crystal display panel 59; and a housing HG (front housing HG1, rear housing HG2) that sandwiches these members.

The liquid crystal display panel 59 attaches an active matrix substrate 51 that includes switching elements such as a TFT (Thin Film Transistor) and the like, and an opposite substrate 52 that faces the active matrix substrate 51 to each other by means of a seal member (not shown). And, liquid crystal (not shown) is injected into a gap between both substrates 51, 52.

Here, a light polarization film 53 is mounted on a light reception surface of the active matrix substrate 51 and on an output surface of the opposite substrate 52. And, the liquid crystal display panel 59 displays an image by using a change in transmittance due to inclination of liquid crystal molecules.

Next, the backlight unit 49, which is situated right under the liquid crystal display panel 59, is described. The backlight unit 49 includes: an LED module (light-emitting module) MJ; a backlight chassis 41; a large reflection sheet 42; a diffusion plate 43; a prism sheet 44; and a micro-lens sheet 45.

Figure 1:
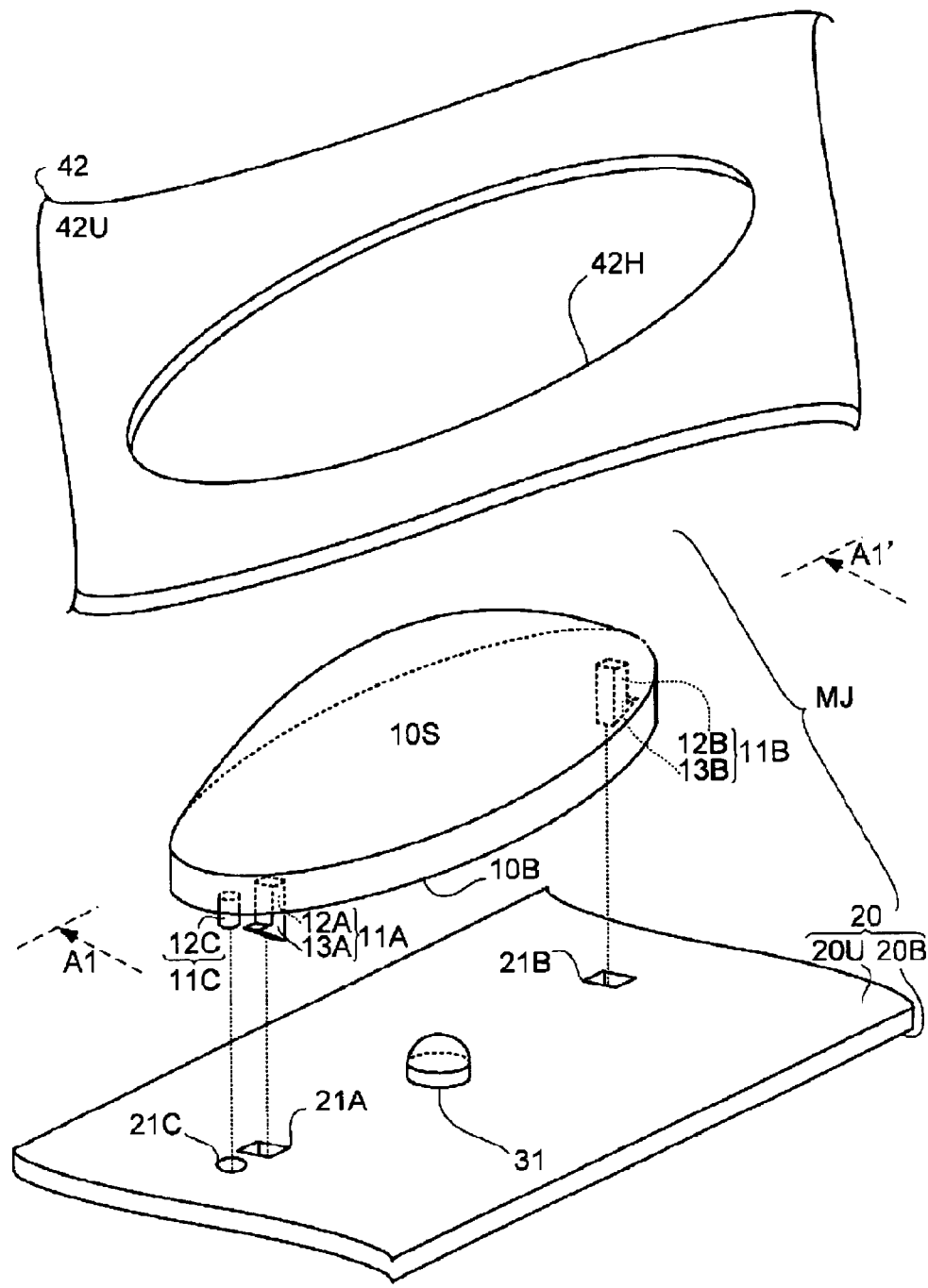
[FIG. 1] is a partial perspective view of an LED module (example 1) shown in FIG. 18.

The LED module MJ, as shown in FIG. 1 that is a partial perspective view of FIG. 18, includes: a mounting substrate 20; an LED (Light Emitting Diode) 31; and a lens 10.

The mounting substrate 20 is a plate-shaped and rectangular substrate and a plurality of electrodes (not shown) are arranged on a mount surface 20U. And, LEDs 31, which are light-emitting elements, are mounted on these electrodes. Here, a resist film (not shown), which serves as a protection film, is formed on the mount surface 20U of the mounting substrate 20. This resist film is not especially limited, however, is desirable to be white that has a reflection characteristic. A reason for this is that even if light enters the resist film, the light reflects off the resist film to travel to outside; accordingly, light absorption by the mounting substrate 20, that is, a cause of light-amount unevenness is solved.

The LED 31 is a light source and emits light by means of an electric current transmitted via the electrode of the mounting substrate 20. And, there are many kinds of the LEDs 31 and the following is an example of the LED 31. For example, there is the LED 31 that includes: an LED chip (light-emitting chip) that emits blue light and a fluorescent body that receives light from the LED chip to emit yellow fluorescent light (here, the LED chip is not especially limited in number). The LED 31 generates white light by means of the light from the blue-light emitting LED chip and the light due to the fluorescent light emission.

However, the fluorescent body incorporated in the LED 31 is not limited to the fluorescent body that emits the yellow fluorescent light. For example, the LED 31 may include: the blue-light emitting LED chip; and fluorescent bodies that receive the light from the LED chip to emit green fluorescent light and red fluorescent light, respectively and may generate white light by means of the blue light from the LED chip and the light (green light and red light) due to the fluorescent light emission.

Besides, the LED chip incorporated in the LED 31 is not limited to the chip that emits the blue light. For example, the LED 31 may include: a red-light emitting red LED chip; a blue-light emitting blue LED chip; and a fluorescent body that receive the light from the blue LED chip to emit green fluorescent light. A reason for this is that such LED 31 is able to generate white light by means of the red light from the red LED chip, the blue light from the blue LED chip and the green light due to the fluorescent light emission.

Besides, the LED 31 may not include any fluorescent body. For example, the LED 31 may include: a red-light emitting red LED chip; a green-light emitting green LED chip; and a blue-light emitting blue LED chip; and generate white light by means of the light from all the LED chips.

Besides, in the backlight unit 49 shown in FIG. 18, one mounting substrate 20 includes: a relatively short mounting substrate 20 on which five LEDs 31 are mounted in a line; and a relatively long mounting substrate 20 on which eight LEDs 31 are mounted in a line.

Especially, the two kinds of mounting substrates 20 are so arranged as to form a line of thirteen LEDs 31 that is composed of the line of five LEDs 31 and the line of eight LEDs 31; further, the two kinds of mounting substrates 20 are also arranged in a direction that intersects (e.g, meets at right angles) the direction in which the thirteen LEDs 31 are arranged. According to this, the LEDs 31 are disposed into a matrix shape and emit surface light (for convenience, the direction in which the different mounting substrates 20 are arranged is defined as an X direction, the direction in which the same kinds of mounting substrates 20 are arranged is defined as a Y direction, and the direction that intersects the X direction and the Y direction is defined as a Z direction.)

Here, the thirteen LEDs 31 arranged in the X direction are electrically connected in series to each other; and the thirteen LEDs 31 connected in series are electrically connected in parallel with other thirteen LEDs 31 that are adjacent along the Y direction and electrically connected in series to each other. And, the LEDs 31 arranged in the matrix shape are parallel-driven.

The lens 10 receives the light from the LED 31 and transmits (outputs) the light. In detail, the lens 10 has a housing concave DH (see FIG. 3B described later), which is able to house the LED 31, on a rear surface 10B (light reception surface) opposite to a lens surface 10S; the housing concave DH is positioned with respect to the LED 31 to cover the LED

31. According to this, the LED 31 is buried in an inside of the lens 10 and the light from the LED 31 is surely supplied to the inside of the lens 10. And, most of the supplied light exits to outside via the lens surface 10S (incidentally, a way of mounting the lens 10 onto the mounting substrate 20 is described later).

Here, a material of the lens 10 is not especially limited; for example, there is an acrylic resin (there is an acrylic resin that has a refractive index nd of 1.49 to 1.50).

The backlight chassis 41, as shown in FIG. 18, is a box-shaped member, for example, and the LED modules MJ are densely disposed on a bottom surface 41B, whereby the plurality of LED modules MJ are housed. Here, the bottom surface 41B of the backlight chassis 41 and the mounting substrate 20 of the LED module MJ are connected to each other via a rivet 33 (see FIG. 17A to FIG. 17C described later), for example.

Besides, the bottom surface 41B of the backlight chassis 41 may be provided with a support pin that supports the diffusion plate 43, the prism sheet 44, and the micro-lens sheet 45 (here, the backlight chassis 41, together with the support pin, may stack up and support the diffusion plate 43, the prism sheet 44, and the micro-lens sheet 45 in this order by means of the top of a side wall.).

The large reflection sheet 42 is an optical sheet that has a reflection surface 42U and covers the plurality of LED modules MJ disposed in the matrix shape with a rear surface of the reflection surface 42U faced with the plurality of LED modules MJ. However, the large reflection sheet 42 is provided with a through-hole 42H aligned with the position of the lens 10 of the LED module MJ, thereby exposing the lens 10 via the reflection surface 42U (here, holes for exposing the above rivet 33 and the support pin may be formed.).

According to this, even if part of the light output from the lens 10 travels toward the bottom surface 41B of the backlight chassis 41, the light reflects off the reflection surface 42U of the large reflection sheet 42 and travels to go away from the bottom surface 41B. Accordingly, thanks to the presence of the large reflection sheet 42, the light from the LED 31 is not lost and travels to the diffusion plate 43 opposite to the reflection surface 42U.

The diffusion plate 43 is an optical sheet that overlies the large reflection sheet 42, and diffuses the light emitted from the LED module MJ and the reflected light from the large reflection sheet 42U. In other words, the diffusion plate 43 diffuses the surface light formed by the plurality of LED modules MJ to spread the light throughout the liquid crystal display panel 59.

The prism sheet 44 is an optical sheet that overlies the diffusion plate 43. And, on the prism sheet 44, triangular prisms each extending in a direction (linear) are arranged on the sheet surface in a direction that intersects the linear direction. According to this, the prism sheet 44 deflects a radiation characteristic of the light from the diffusion plate 44. Here, the prisms preferably extend along the Y direction in which the small number of LEDs 31 are disposed and are arranged along the X direction in which the large number of LEDs 31 are disposed.

The micro-lens sheet 45 is an optical sheet that overlies the prism sheet 44. And, in the inside of the micro-lens sheet 45, micro-particles for refracting and scattering the light are dispersed. According to this, the micro-lens sheet 45 does not locally concentrate the light from the prism sheet 44, thereby curbing brightness difference (light-amount unevenness).

And, the above-described backlight unit 49 transmits the surface light formed by the plurality of LED modules MJ through the plurality of optical sheets 43 to 45 and supplies the light to the liquid crystal display panel 59. According to this, the non-light emitting liquid crystal display panel 59 receives the light (backlight) from the backlight unit 49 to increase a display function.

Figure 4A:
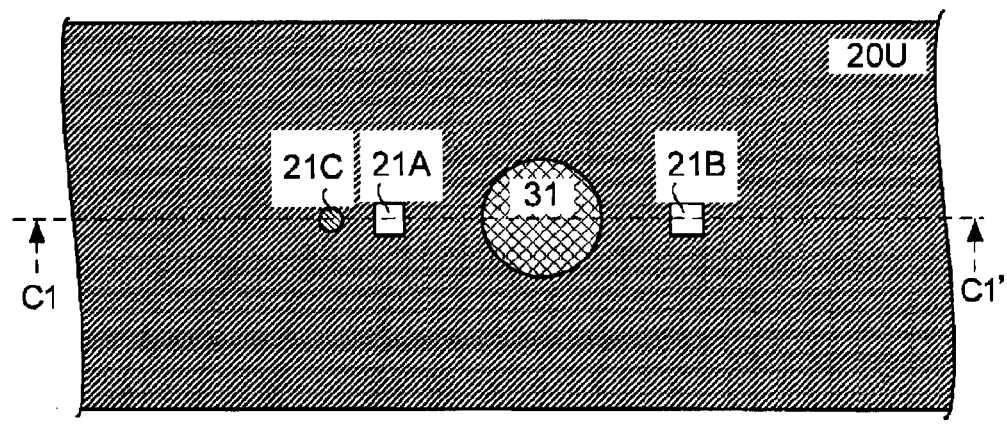
[FIG. 4A] is a front view of a mounting substrate of the LED module according to the example 1.
Figure 4B:
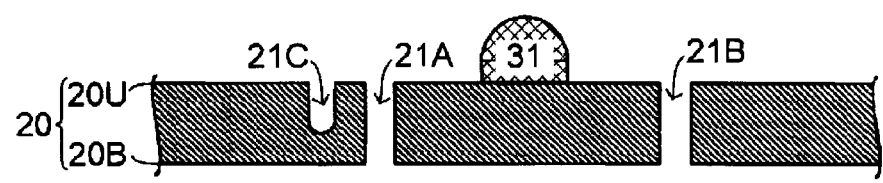
[FIG. 4B] is a sectional view of the mounting substrate of the LED module according to the example 1 (here, the sectional direction of the sectional view is a C1-C1' arrow direction in FIG. 4A.).
Figure 5:
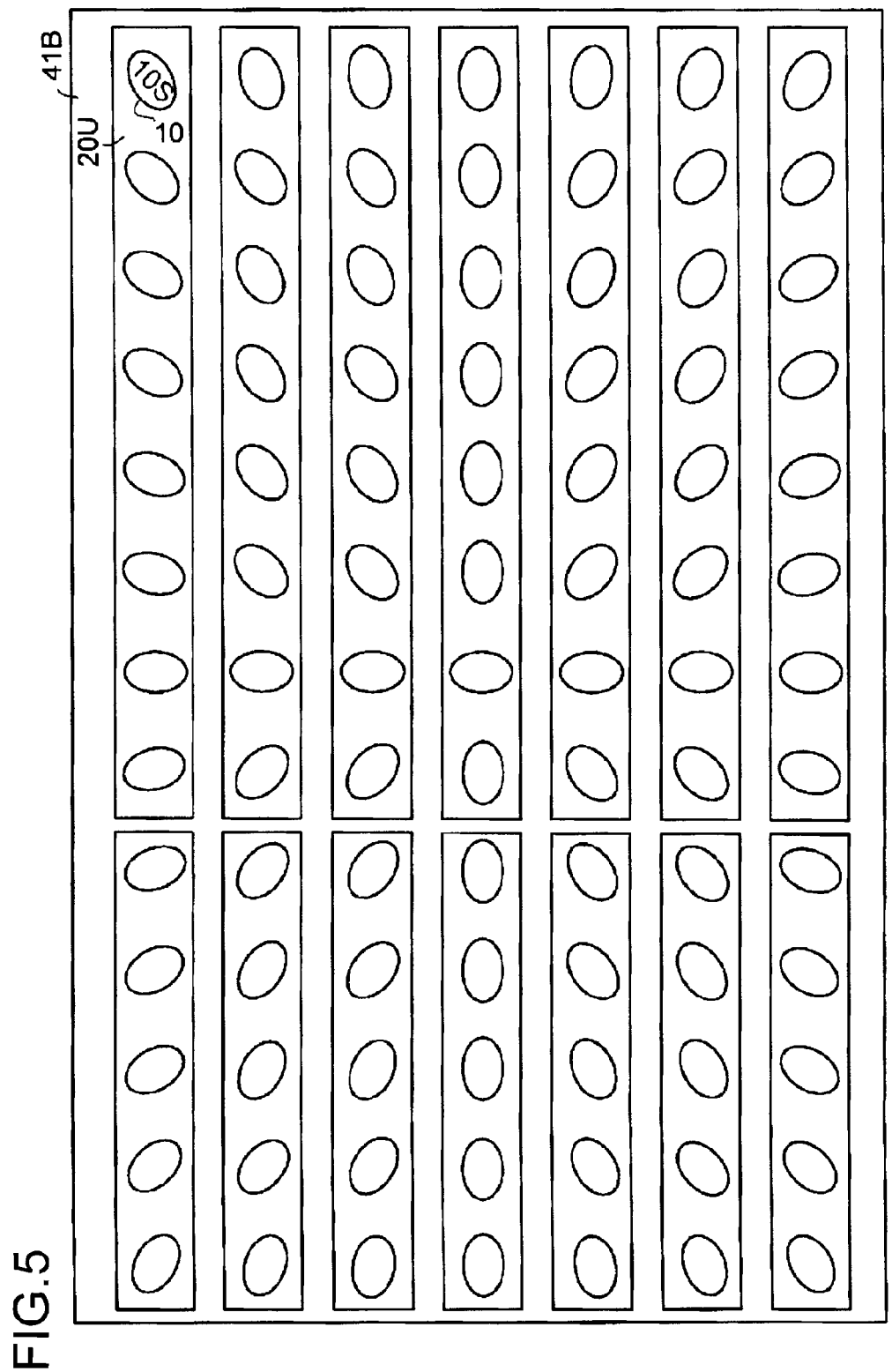
[FIG. 5] is a plan view when viewing, from front, lenses that are arranged two-dimensionally.

Here, a way of disposing and mounting the lens 10 of the LED module MJ is described using FIG. 1 to FIG. 6. FIG. 5 is a plan view when viewing the lenses 10 that are arranged two-dimensionally; and FIG. 6 is a plan view that shows the LED 31 and holes 21A to 21C formed in or through the mounting substrate 20 to mount the lens 10 (here, in FIG. 6, for convenience, the outer shape of the lens 10 is shown by a one-dot-one-bar line.).

Figure 2A:
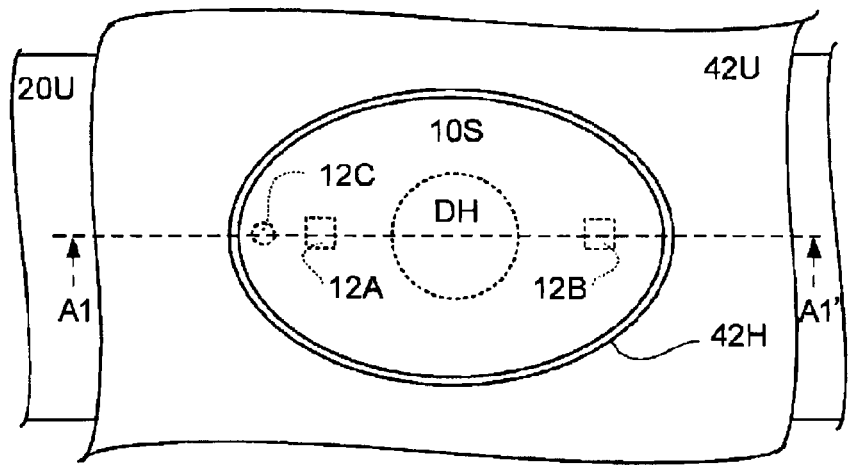
[FIG. 2A] is a front view of the LED module according to the example 1.
Figure 2B:
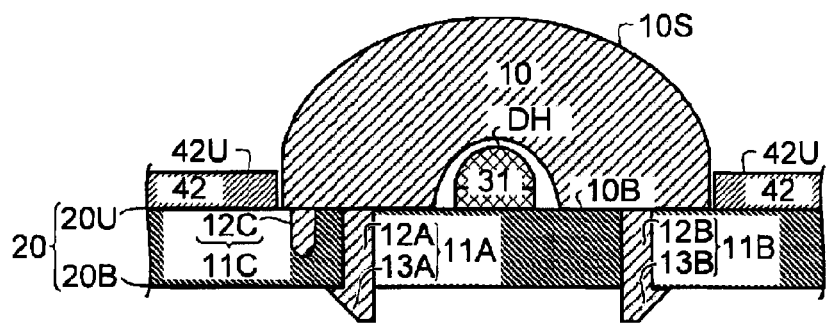
[FIG. 2B] is a sectional view of the LED module according the example 1 (here, the sectional direction of the sectional view is an A1-A1' arrow direction in FIG. 1 and FIG. 2A.).
Figure 2C:
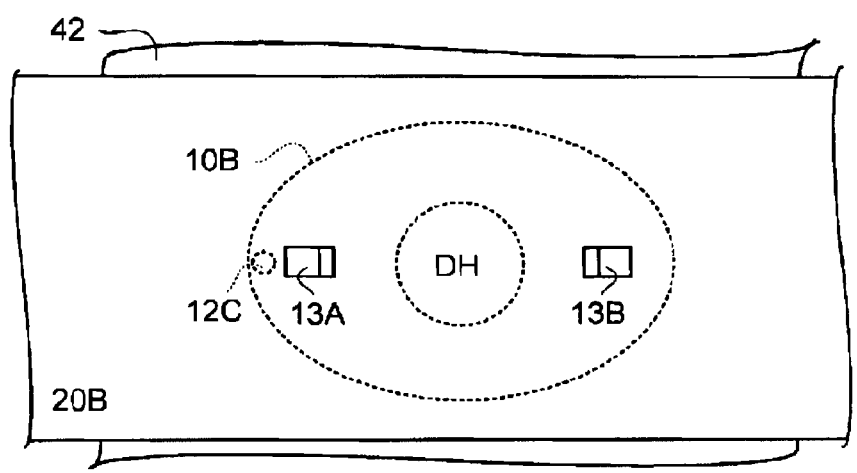
[FIG. 2C] is a rear view of the LED module according to the example 1.
Figure 3A:
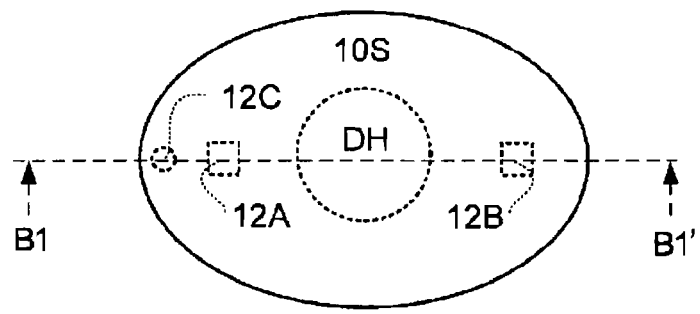
[FIG. 3A] is a front view of a lens of the LED module according to the example 1.
Figure 3B:
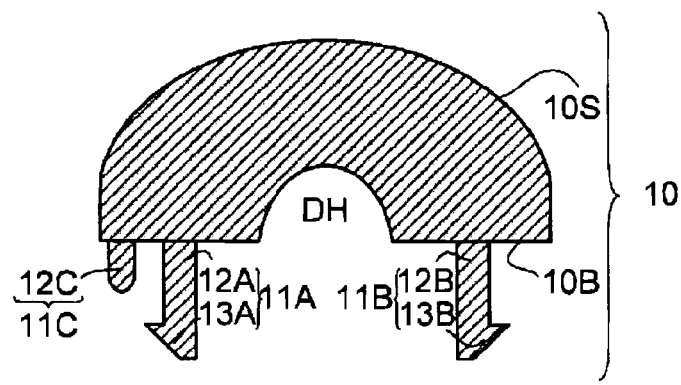
[FIG. 3B] is a sectional view of the lens of the LED module according the example 1 (here, the sectional direction of the sectional view is a B1-B1' arrow direction in FIG. 3A.).
Figure 3C:
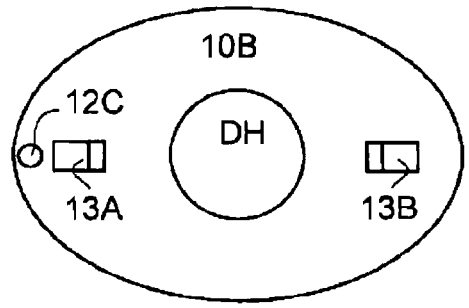
[FIG. 3C] is a rear view of the lens of the LED module according to the example 1.

Besides, FIG. 1 is a partial perspective view of the LED module MJ; FIG. 2A to FIG. 2C are a front view, a sectional view, and a rear view of the LED module MJ, respectively (here, the sectional direction of the sectional view is an A1-A1' arrow direction in FIG. 1 and FIG. 2A.). FIG. 3A to FIG. 3C are a front view, a sectional view, and a rear view of the lens 10, respectively (here, the sectional direction of the sectional view is a B1-B1' arrow direction in FIG. 3A.); FIG. 4A and FIG. 4B are a front view, and a sectional view of the mounting substrate, respectively (here, the sectional direction of the sectional view is a C1-C1' arrow direction in FIG. 4A.). Here, the LED module MJ shown in FIG. 1 and others is called an example 1 (EX1).

First, a shape of the lens 10 is described. As shown in FIG. 2A to FIG. 2C and others, the lens 10 includes: the rear surface 10B that is provided with the housing concave DH for housing the LED 31; and the curved lens surface 10S that is situated oppositely to the rear surface 10B and outputs the light emitted from the LED 31. Especially, when viewing from the front (in detail, when viewing, from the front, an XY plane defined by the X direction and the Y direction), the lens 10 includes the lens surface 10S that has an ellipse shape (in other words, the circumferential shape of the foot of the lens surface 10S is the elliptic.).

In a case where the lens 10, which includes such elliptic circumferential shape and the curved lens surface 10S, transmits the light, the light is diffused, but most of the light is deflected in a direction (directivity direction) along a minor-axis direction of the elliptic shape. And, as shown in FIG. 5 and FIG. 6, in the LED module MJ, the lens 10 is disposed such that a major-axis direction of the lens 10 is along a radiation direction. In other words, the plurality of lenses 10 are radially arranged with respect to a point near a center of the bottom surface 41B of the backlight chassis 41.

According to this, the directions of the light output from the respective lenses 10 are variously different. Because of this, even if the lenses 10 are disposed in the matrix shape, light-amount unevenness having an interference pattern (e.g., a lattice shape) due to the disposition does not appear. Besides, the lens 10 spreads, by means of the direction of itself, the transmitted light into the corners of the backlight chassis 41 which often becomes relatively dark.

For example, the corners of the backlight chassis 41 are preferably situated in the directions in which the lens 10 deflects most of the light. And, according to this, the light spreads into the corner of the liquid crystal display panel 59 that overlies the bottom surface 41B of the backlight chassis 41 as well, whereby light-amount unevenness becomes unlikely to occur on the liquid crystal display panel 59.

In the meantime, as described above, in the case where the transmitted light from the lens 10 has directivity, the direction in which to mount the lens 10 onto the mounting substrate 20 becomes important. Because of this, first, a way of mounting the lens 10 (in other words, a connection mechanism for the lens 10 and the mounting substrate 20) is described.

As shown in FIG. 3A to FIG. 3C, the lens 10 includes: the rear surface 10B which is provided with the housing concave DH for housing the LED 31; and the curved lens surface 10S that is situated oppositely to the rear surface 10B and outputs the light emitted from the LED 31. Further, the lens 10 includes pins 11 as well (11A to 11C; first restriction portion/second restriction portion) that protrude from the rear surface 10B. These pins 11A to 11C engage with holes 21 (21A to 21C; second restriction portion/first restriction portion) that are formed in or through the mounting substrate 20 as shown in FIG. 4A and FIG. 4B, whereby the lens 10 is mounted onto the mounting substrate 20.

In detail, the pins 11A, 11B are so formed as to interpose the housing concave DH on the rear surface 10B of the lens 10. Specifically, the pin 11A is situated on one end side in the major-axis direction of the elliptic shape, while the pin 11B is situated on the other end side in the major-axis direction of the elliptic shape (here, the pin 11A and the pin 11B are in a symmetrical relationship with respect to a point.). These pins 11A, 11B include: a quadrangular pole-shaped shank portion 12 (12A, 12B) that extends to go away from the rear surface 10B of the lens 10; and a flexible engagement piece 13 (13A, 13B) that is formed near a tip of the shank portion 12 (here, the engagement piece 13 is a flexible piece member that protrudes from a side wall of the shank portion 12 near the tip of the shank portion 12.).

On the other hand, as shown in FIG. 4A and FIG. 4B, the mounting substrate 20 is provided with the holes 21A and 21B that have a shape similar to and slightly larger than the shape of the shank circumference (quadrangular shank circumference) of the shank portions 12A and 12B of the pins 11A and 11B such that the holes 21A and 21B interpose the LED 31. And, the pins 11A, 11B are inserted into the holes 21A, and 21B, respectively. The shank portions 12A, 12B of the pins 11A, 11B are slightly longer than the thickness of the mounting substrate 20 and the holes 21A, 21B penetrate the mounting substrate 20. Because of this, when the pins 11A, 11B are inserted into the holes 21A and 21B, the tips of the shank portions 12A, 12B protrude from the rear surface 20B opposite to the mount surface 20U.

Here, during the process in which the shank portions 12A, 12B of the pins 11A, 11B go into the holes 21A and 21B, the engagement pieces 13A, 13B are so pressed and deformed by inner walls of the holes 21A, 21B as to fit into the holes 21A, 21B. However, when the tips of the shank portions 12A, 12B protrude from the rear surface 20B opposite to the mount surface 20U, the engagement pieces 13A, 13B are not pressed by the inner walls of the holes 21A, 21B; accordingly, the engagement pieces 13A, 13B restore the original shape. According to this, as shown in FIG. 2B, the engagement pieces 13A, 13B hook onto edges of the holes 21A and 21B, whereby the lens 10 is mounted onto the mounting substrate 20.

On the other hand, the pin 11C is formed at a position that is close to the pin 11A and, for example, closer to an outer edge of the rear surface 10B of the lens 10 than the pin 11A is. The pin 11C is formed of a cylindrical shank portion 12C only, for example (here, this shank portion 12C may be shorter than the thickness of the mounting substrate 20.).

And, the hole 21C corresponding to the pin 11C has a length long enough to accommodate the total length of the shank portion 12C and is formed near the hole 21A (here, the hole 21C is a hole including a shape that is slightly larger than and similar to the shape of the shank circumference (circular shank circumference) of the shank portion 12C of the pin 11C.). In detail, the hole 21C is formed at an end of the mounting substrate 20 that touches the tip of the pin 11C during the process in which the pins 11A, 11B are inserted into the holes 21A, 21B.

According to this, when the pins 11A, 11B are inserted into the holes 21A and 21B; the engagement pieces 13A, 13B hook onto the edges of the holes 21A and 21B; and the lens 10 is mounted onto the mounting substrate 20, the pin 11C fits into the hole 21C as shown in FIG. 2B.

The pins 11A to 11C and the holes 21A to 21C are intended to mount the lens 10 onto the mounting substrate 20 by means of only one way of mounting. For example, in a case where the pin 11C is not present and only the pins 11A and 11B are formed on the rear surface 10B of the lens 10, even if the pins 11A, 11B are so designed as to fit into the holes 21A and 21B, there is a likelihood that the pin 11A is fitted into the hole 21B and the pin 11B is fitted into the hole 21A.

However, the pin 11C is formed on the lens 10 and the hole 21C, into which the pin 11C fits, is formed in the mounting substrate 20; and the pins 11A, 11B are so designed as to fit into the holes 21A and 21B; accordingly, the pin 11A is not fitted into the hole 21B and the pin 11B is not fitted into the hole 21A. In other words, the pin 11A is fitted into the hole 21A, the pin 11B is fitted into the hole 21B, and the pin 11C is fitted into the hole 21C, and are not fitted with any other ways.

Figure 7A:
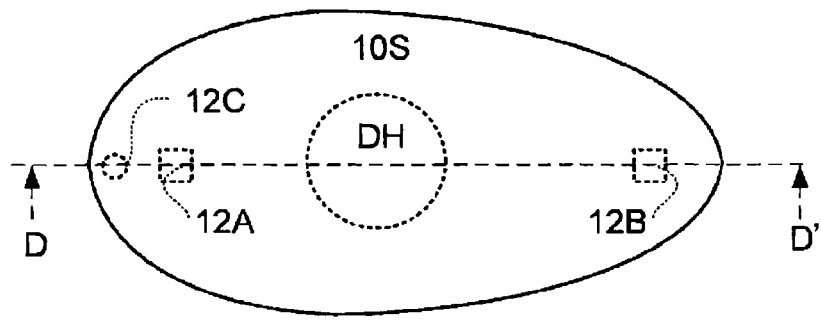
[FIG. 7A] is a front view of an egg-shaped lens.
Figure 7B:
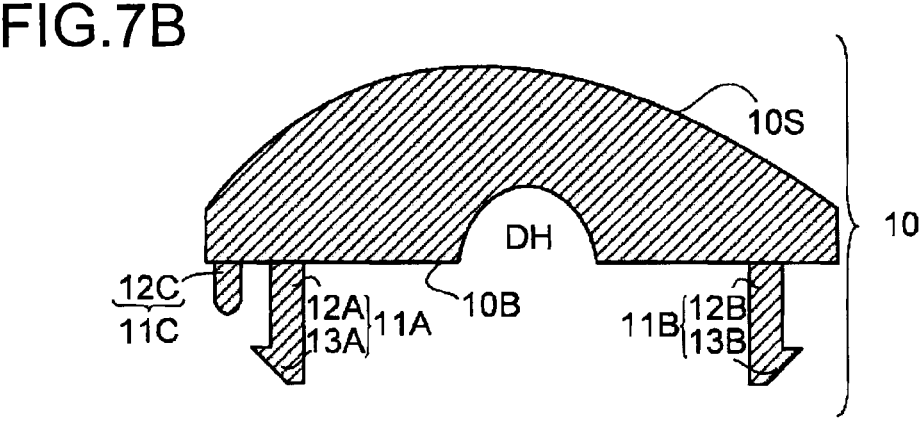
[FIG. 7B] is a sectional view of an egg-shaped lens (here, the sectional direction of the sectional view is a D-D' arrow direction in FIG. 7A.)
Figure 7C:
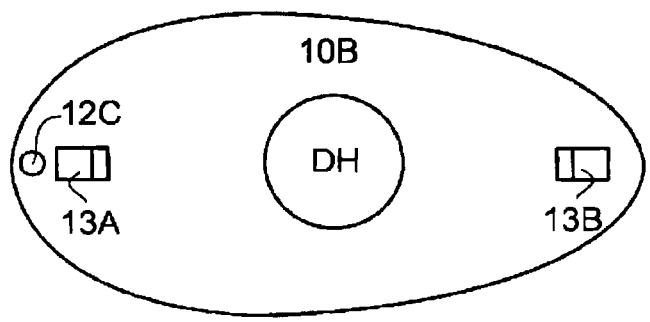
[FIG. 7C] is a rear view of an egg-shaped lens.

For example, as shown in FIG. 7A to FIG. 7C, in a case where the shape of the lens 10 is an egg shape when viewing from the front, it is desirable that the pin 11A is fitted into the hole 21A, the pin 11B is fitted into the hole 21B, and the pin 11C is fitted into the hole 21C, and are not fitted with any other ways.

Figure 8A:
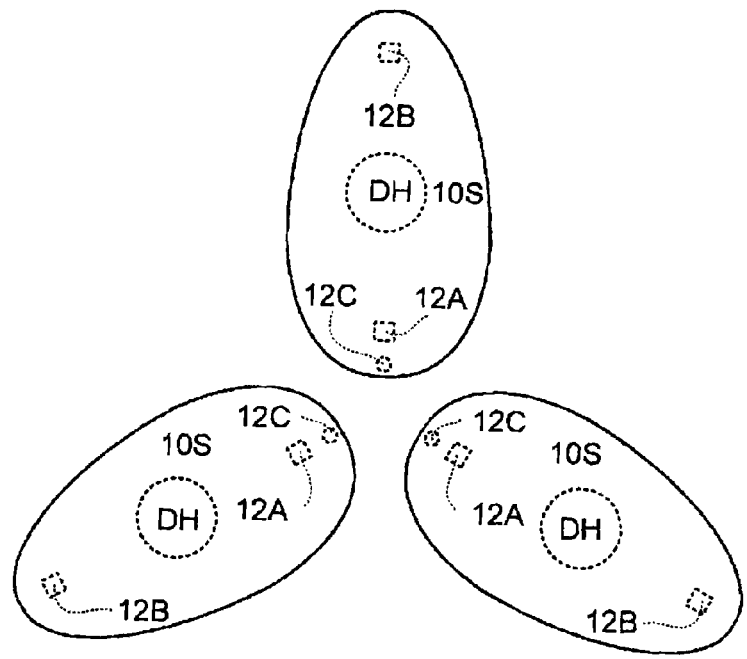
[FIG. 8A] is a plan view showing a desired disposition of egg-shaped lenses.
Figure 8B:
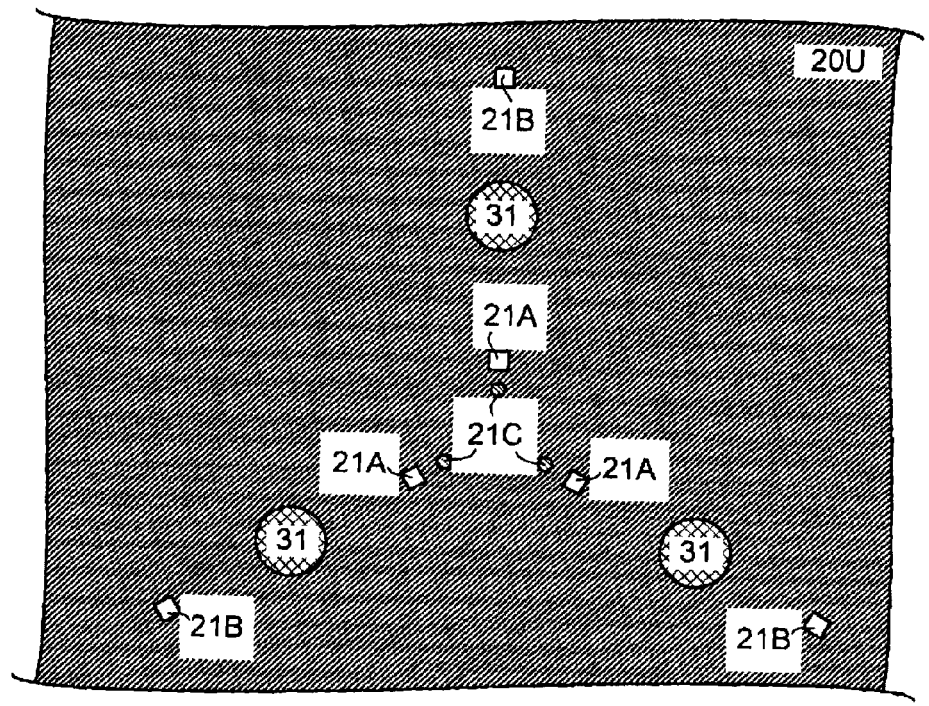
[FIG. 8B] is a plan view showing an example of a disposition of holes required to achieve the lens disposition of the egg-shaped lenses shown in FIG. 8A.

In detail, as shown in FIG. 8A, in a case where three lenses 10 are radially arranged such that smaller portions of the egg-shaped lenses 10 are away from a center of the radiation, the pins 11C situated on larger portions of the egg-shaped lenses 10 gather at the center of the radiation. Because of this, as shown in FIG. 8B, also in the mounting substrate 20, the holes 21C in which the pins 11C fit are formed at the center of the radiation. And, if the three lenses 10 are mounted onto the mounting substrate 20, a desired disposition of the lenses 10 as shown in FIG. 8A is achieved.

Figure 9A:
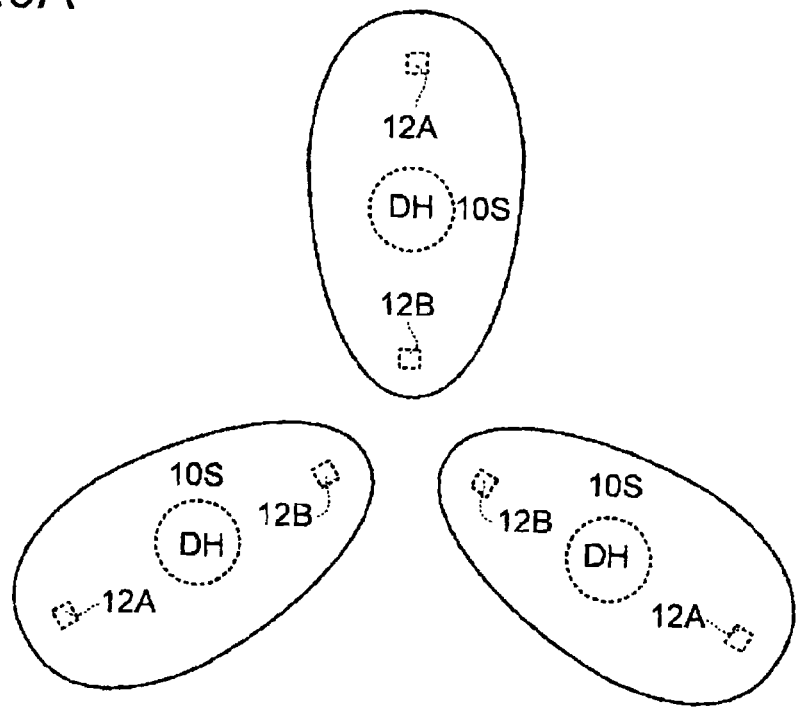
[FIG. 9A] is a plan view showing a desired disposition of egg-shaped lenses different from FIG. 8A.
Figure 9B:
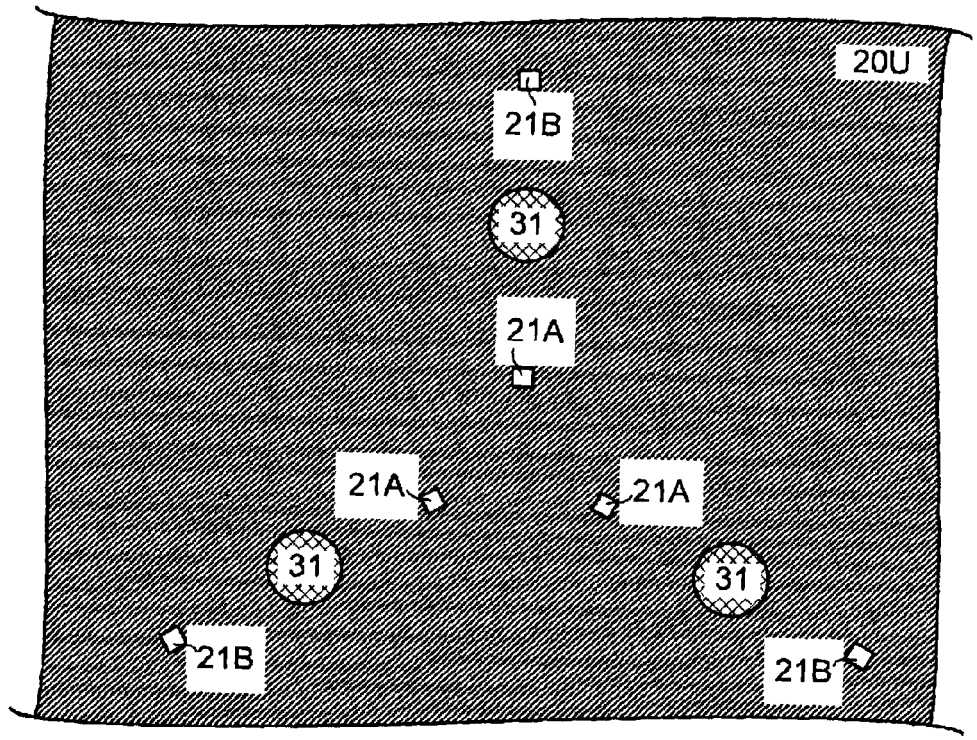
[FIG. 9B] is a plan view showing an example of a disposition of holes required to achieve the lens disposition shown in FIG. 9A.

However, as shown in FIG. 9B, in a case where the mounting substrate 20 is not provided with the hole 21C and provided with the holes 21A and 21B only (naturally, the lens 10 is provided with the pins 11A and 11B only), as shown in FIG. 9A, there is a likelihood that the three lenses 10 are arranged such that the larger portions of the egg-shaped lenses 10 are away from the center of the radiation.

If the lenses 10 are arranged as shown in FIG. 9A, the arrangement is the same radial arrangement as that of the lenses 10 in FIG. 8A, but the directions of the lenses 10 are different. And, if the directions of the lenses 10 are different from each other, the directions in which part of the light from the lens 10 is deflected are different from each other. Accordingly, an illuminance distribution (and a brightness distribution) obtained from the arrangement of the lenses 10 as shown in FIG. 8A is not obtained from the arrangement of the lenses 10 as shown in FIG. 9A.

In other words, in a case where the lens 10 outputs part of the light in an directivity direction that is an deflected direction, in the LED module MJ, of the holes 21A to 21C and the pins 11A to 11C that engage with each other, the holes 21A to 21C are formed in or through the mounting substrate 20, while the pins 11A to 11C are formed on the lens 10. And, the holes 21A to 21C engage with the pins 11A to 11C by means of the only one way of engagement, thereby restricting the direction of the lens 10, that is, the directivity direction of the lens 10 to a specific direction (here, in optical design, the specific direction is an arbitrary direction in which the output light from the lens 10 is guided.).

According to this, even if the LED 31 has regularity and is arranged in the matrix shape, by covering the LED 31 with one kind of lens 10, it is possible to variously change the illuminance distribution of the surface light formed by the plurality of LEDs 31 (e.g., it is possible to increase the illuminance near the center of the surface light and the illuminance of the surface light near the circumference.). A reason for this is that the light is diffused via the lens 10 while having directivity and the directivity direction is set at any direction.

In addition, the LED module MJ is able to variously change the brightness distribution of the backlight; nevertheless, it is sufficient if there is one kind of lenses 10. Because of this, the production cost of the lens 10 is curbed and the cost reductions of the LED module MJ, the backlight units 49 and further the liquid crystal display device 69 are achieved. Besides, the directivity direction of the lens 10 (and the direction of the lens 10) is restricted by the pin 11 and the hole 21 that engage with each other by means of the only one way of engagement; accordingly, the positioning of the lens 10 becomes easy (in other words, the production burden of the LED module MJ reduces.).

[Embodiment 2]

An embodiment 2 is described. Here, members having the same functions as members used in the embodiment 1 are indicated by the same reference numbers and description of them is skipped.

In the LED module MJ according to the example 1 of the embodiment 1, the lens 10 is provided with the three pins 11A to 11C. However, the number of pins 11 is not limited to three. Because of this, as an example 2 (EX2), the LED module MJ, which incorporates the lens 10 having two pins 11, is described using FIG. 10A to FIG. 12B.

Figure 10A:
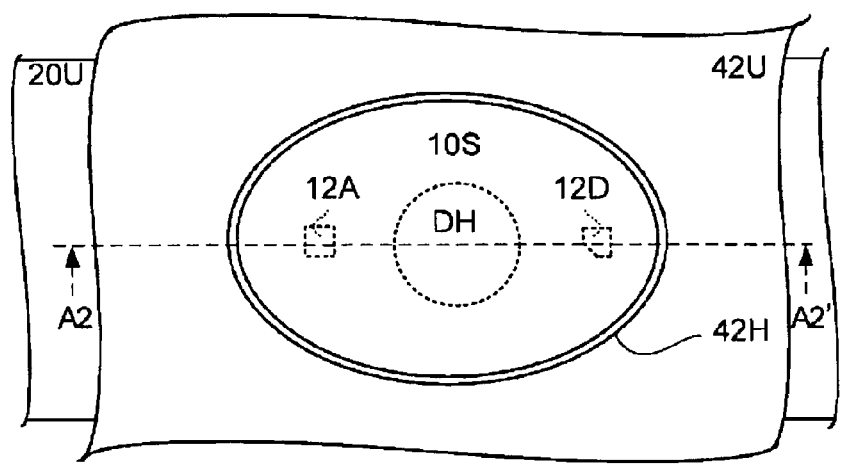
[FIG. 10A] is a front view of an LED module according to an example 2.
Figure 10B:
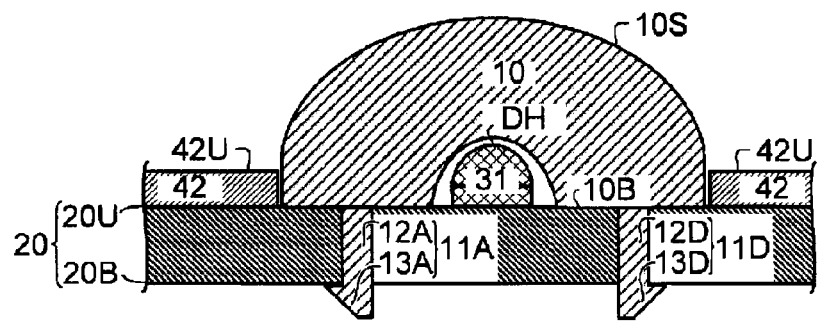
[FIG. 10B] is a sectional view of the LED module according the example 2 (here, the sectional direction of the sectional view is an A2-A2' arrow direction in FIG. 10A.).
Figure 10C:
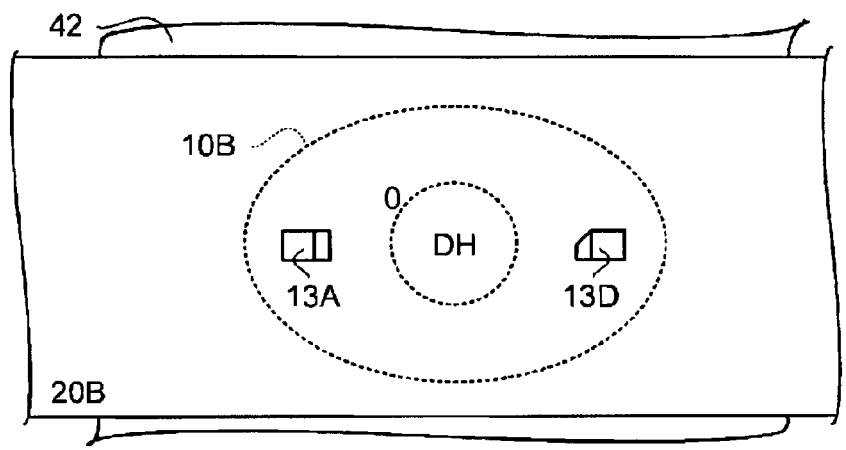
[FIG. 10C] is a rear view of the LED module according to the example 2.
Figure 11A:
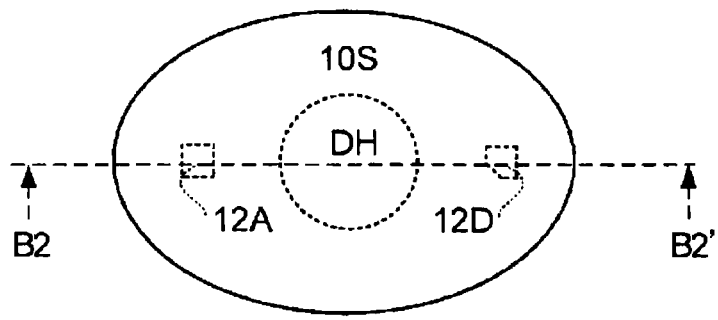
[FIG. 11A] is a front view of a lens of the LED module according to the example 2.
Figure 11B:
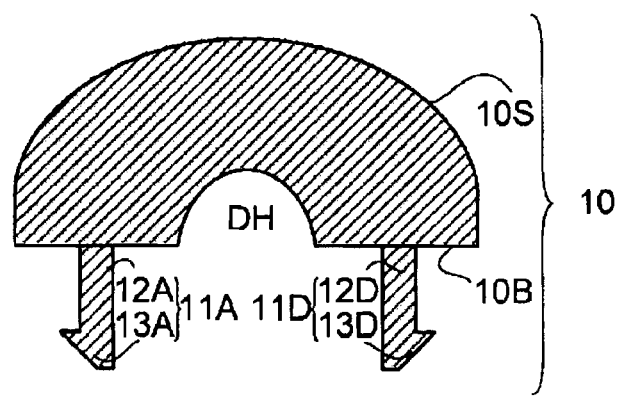
[FIG. 11B] is a sectional view of the lens of the LED module according the example 2 (here, the sectional direction of the sectional view is a B2-B2' arrow direction in FIG. 11A.).
Figure 11C:
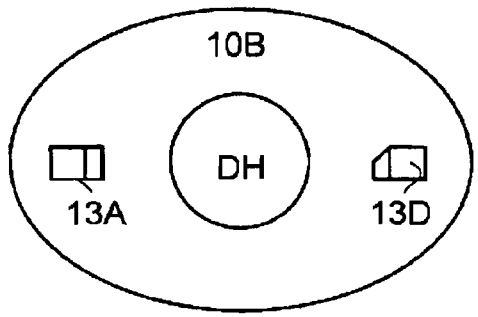
[FIG. 11C] is a rear view of the lens of the LED module according to the example 2.
Figure 12A:
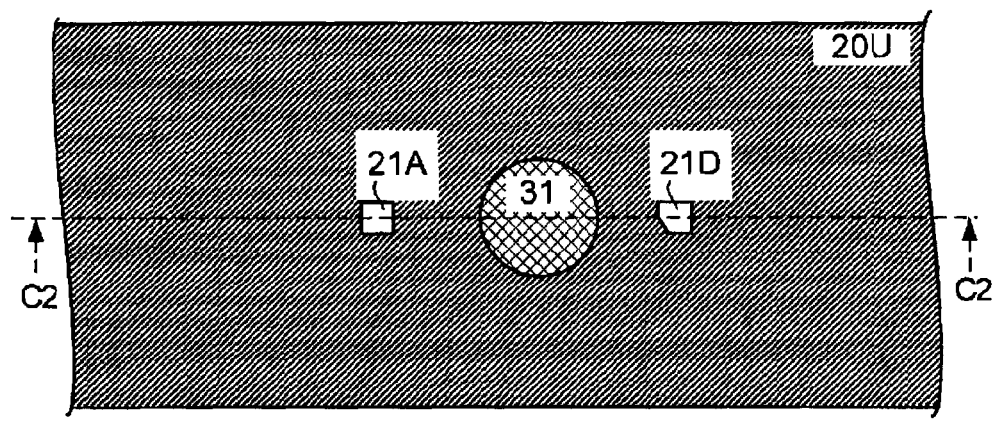
[FIG. 12A] is a front view of a mounting substrate of the LED module according to the example 2.
Figure 12B:
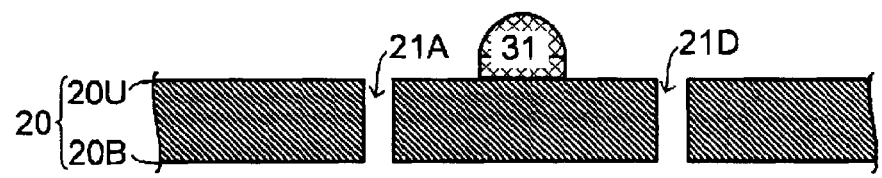
[FIG. 12B] is a sectional view of the mounting substrate of the LED module according to the example 2 (here, the sectional direction of the sectional view is a C2-C2' arrow direction in FIG. 12A.).

FIG. 10A to FIG. 10C are a front view, a sectional view, and a rear view of the LED module MJ, respectively (here, the sectional direction of the sectional view is an A2-A2' arrow direction in FIG. 10A.). FIG. 11A to FIG. 11C are a front view, a sectional view, and a rear view of the lens 10, respectively (here, the sectional direction of the sectional view is a B2-B2' arrow direction in FIG. 11A.); FIG. 12A and FIG. 12B are a front view, and a sectional view of the mounting substrate, respectively (here, the sectional direction of the sectional view is a C2-C2' arrow direction in FIG. 12A.).

As shown in FIG. 11A to 11C, the lens 10 includes the pin 11A and the pin 11D on the rear surface 10B. In detail, the pin 11A and the pin 11D are, like the pin 11A and the pin 11B in the example 1, so formed as to interpose the housing concave DH (here, the pin 11A and the pin 11D are in a symmetrical relationship with respect to a point.).

The pin 11A is the same as the pin 11A of the lens 10 according to the example 1, accordingly, the hole 21A, which is the same as that in the example 1, is formed through the mounting substrate 20. On the other hand, the pin 11D (first restriction portion/second restriction portion) includes a shank portion 12D that is different from the pin 11A. In detail, the pin 11D includes the shank portion 12D whose shank circumference has a trapezoidal shape. The shank portion 12D is slightly longer than the thickness of the mounting substrate 20 and includes an engagement piece 13D at a tip.

And, a hole 21D (second restriction portion/first restriction portion) corresponding to the pin 11D is formed through the mounting substrate 20. The hole 21D is a hole including a shape slightly larger than and similar to the shape of the shank circumference of the shank portion 12D of the pin 11D; and penetrates the mounting substrate 20. Because of this, when the pins 11A, 11D are inserted into the holes 21A and 21D, the tips of the shank portions 12A and 12D protrude from the rear surface 20B opposite to the mount surface 20U. And, when the tips of the shank portions 12A, 12D protrude from the rear surface 20B opposite to the mount surface 20U, the engagement pieces 13A, 13D hook onto the edges of the holes 21A, 21D; and the lens 10 is mounted onto the mounting substrate 20.

The pins 11D and the hole 21D are intended to mount the lens 10 onto the mounting substrate 20 by means of only one way of mounting. For example, in a case where instead of the pin 11D, the pin 11B in the example 1 is formed on the rear surface 10B of the lens 10, even if the pins 11A is so designed as to fit into the hole 21A and the pin 11B is so designed as to fit into the holes 21B, there is a likelihood that the pin 11A is fitted into the hole 21B and the pin 11B is fitted into the hole 21A.

However, instead of the pin 11B, the pin 11D is formed on the lens 10 and the hole 21D, into which the pin 11D fits, is formed through the mounting substrate 20; and the pin 11A is so designed as to fit into the hole 21A and the pin 11D is so designed as to fit into the holes 21D; accordingly, there are no other ways of fitting.

In other words, of the holes 21A and 21D and the pins 11A and 11D that engage with each other, the holes 21A and 21D are formed through the mounting substrate 20, while the pins 11A and 11D are formed on the lens 10. And, the holes 21A and 21D engage with the pins 11A and 11D by means of the only one way of engagement, thereby restricting the direction of the lens 10 (the directivity direction of the lens 10) to a specific direction.

Accordingly, the LED module achieves the same function and effect as the embodiment 1. In other words, in the LED module, the light is diffused via the lens 10 while having directivity and the directivity direction is set arbitrarily. Besides, the LED module MJ is able to variously change the illuminance distribution of the backlight; nevertheless, it is sufficient if there is one kind of lenses 10. Further, the production burden of the LED module MJ is small.

Besides, the LED module MJ according to the example 2 allows the number of pins 11 to be reduced compared with the LED module MJ according to the example 1; accordingly, it is possible to further curb the production cost of the lens 10. Because of this, the cost reductions of the LED module MJ, the backlight unit 49 and further the liquid crystal display device 69 are achieved.

Figure 13A:
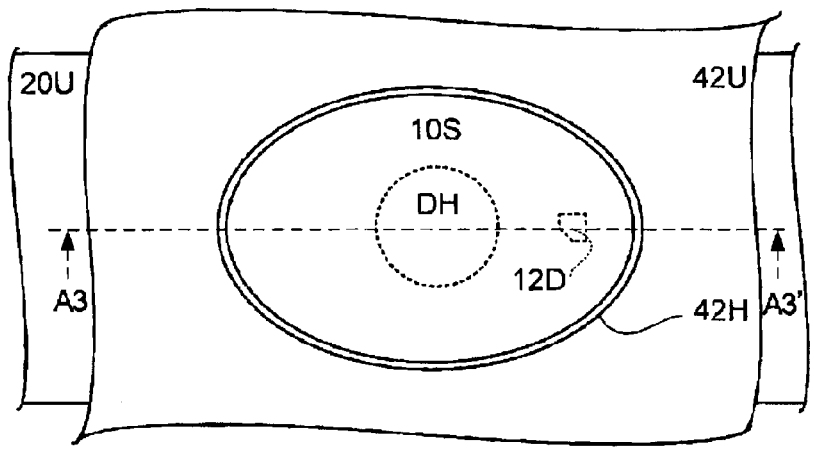
[FIG. 13A] is a front view of an LED module according to an example 3.
Figure 13B:
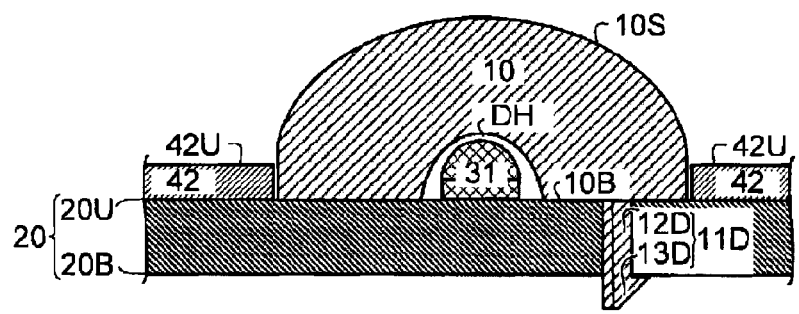
[FIG. 13B] is a sectional view of the LED module according the example 3 (here, the sectional direction of the sectional view is an A3-A3' arrow direction in FIG. 13A.).
Figure 13C:
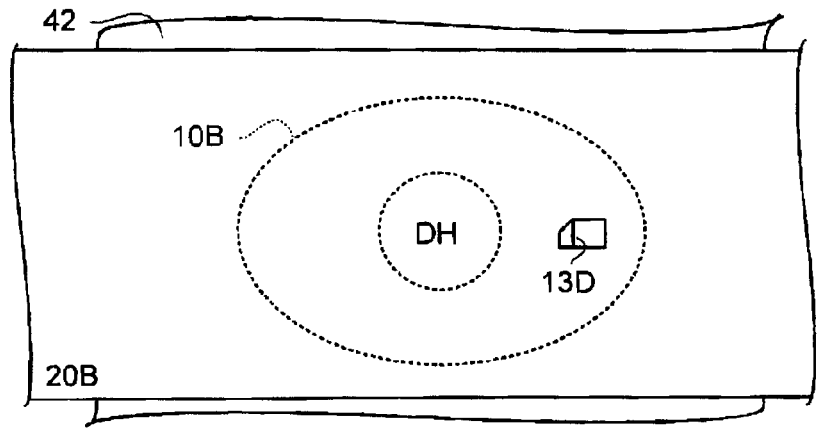
[FIG. 13C] is a rear view of the LED module according to the example 3.

In the meantime, as shown in FIG. 13A to 13C, in the LED module MJ according to the example 2, the lens 10 may be provided with the pin 11D only; and the mounting substrate 20 may be provide with the hole 21D only (here, such LED module is called an example 3 (EX3).).

The trapezoidal shape (sectional shape interesting the shank direction) of the shank circumference of the shank portion 12D of the pin 11D is a trapezoidal shape that is not symmetrical with respect to a point nor symmetrical with respect a line; and in accordance with the trapezoidal shape, the trapezoidal shape of the hole 21D also is not symmetrical with respect to a point nor symmetrical with respect to a line (here, three of the four corners have an angle of 90°.). Because of this, the hole 21D engages with the pin 11D by means of the only one way of engagement, thereby restricting the directivity direction of the lens 10 to a specific direction. Accordingly, the LED module MJ according to the example 3 achieves the same function and effect as the LED module MJ according the example 2.

[Embodiment 3]

An embodiment 3 is described. Here, members having the same functions as members used in the embodiments 1 and 2 are indicated by the same reference numbers and description of them is skipped.

In the example 1 of the embodiment 1 and the examples 2 and 3 of the embodiment 2, the pin 11 restricts the direction of the lens 10 (and the directivity direction of the lens 10). However, it is not the pin 11 only that restricts the direction of the lens 10. Here, the LED module MJ according to an example 4 (EX4), which restricts the direction of the lens 10, is described using FIG. 14A to FIG. 16B.

Figure 14A:
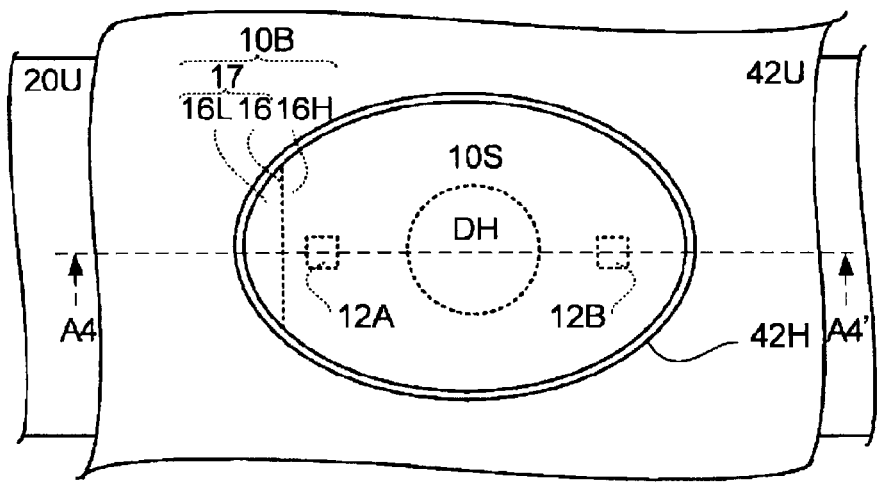
[FIG. 14A] is a front view of an LED module according to an example 4.
Figure 14B:
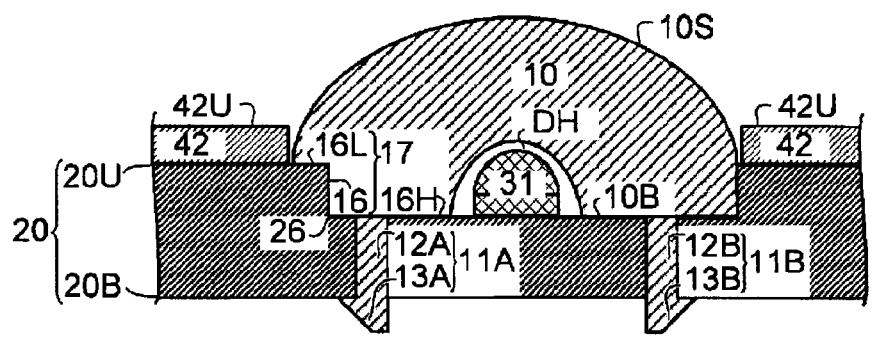
[FIG. 14B] is a sectional view of the LED module according the example 4 (here, the sectional direction of the sectional view is an A4-A4' arrow direction in FIG. 14A.).
Figure 14C:
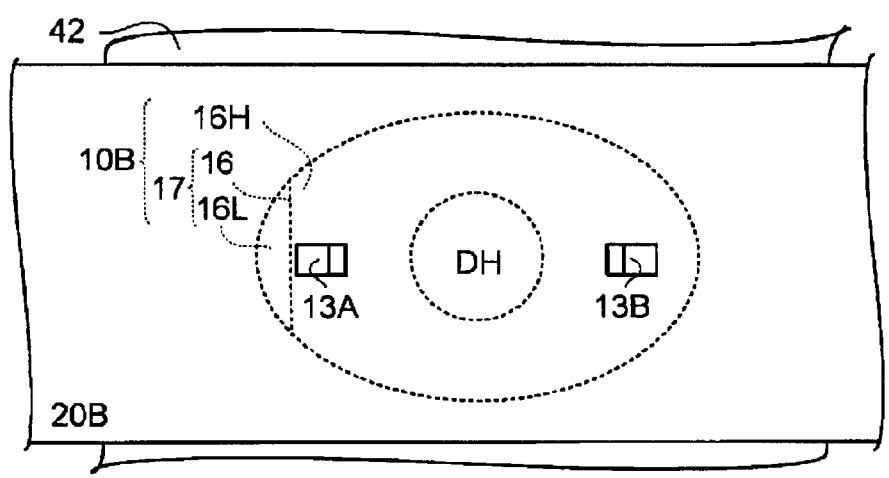
[FIG. 14C] is a rear view of the LED module according to the example 4.
Figure 15A:
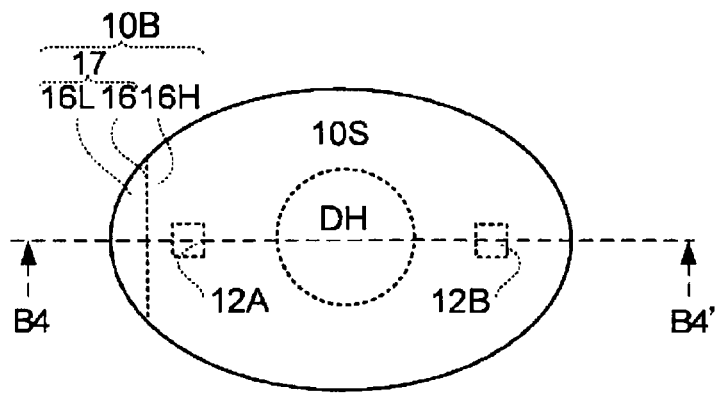
[FIG. 15A] is a front view of a lens of the LED module according to the example 4.
Figure 15B:
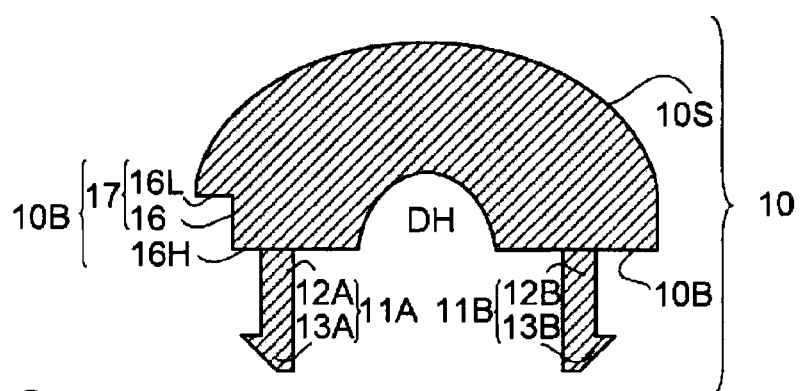
[FIG. 15B] is a sectional view of the lens of the LED module according the example 4 (here, the sectional direction of the sectional view is a B4-B4' arrow direction in FIG. 15A.).
Figure 15C:
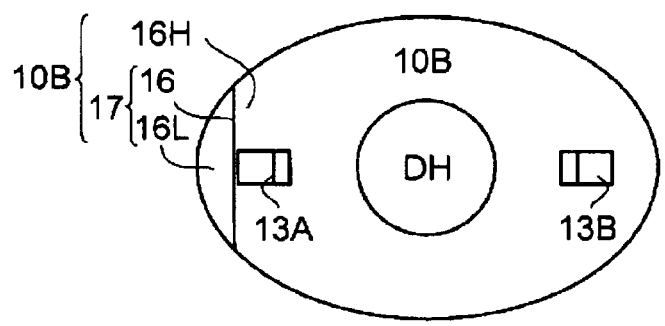
[FIG. 15C] is a rear view of the lens of the LED module according to the example 4.
Figure 16A:
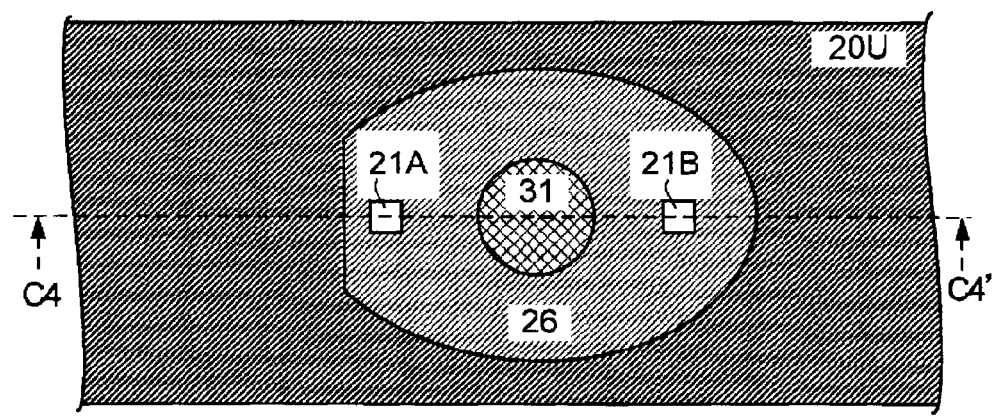
[FIG. 16A] is a front view of a mounting substrate of the LED module according to the example 4.
Figure 16B:
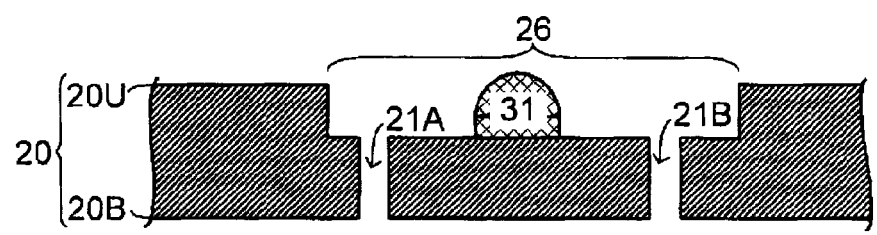
[FIG. 16B] is a sectional view of the mounting substrate of the LED module according to the example 4 (here, the sectional direction of the sectional view is a C4-C4' arrow direction in FIG. 16A.).

FIG. 14A to 14C are a front view, a sectional view, and a rear view of the LED module MJ, respectively (here, the sectional direction of the sectional view is an A4-A4' arrow direction in FIG. 14A.). FIG. 15A to FIG. 15C are a front view, a sectional view, and a rear view of the lens 10, respectively (here, the sectional direction of the sectional view is a B4-B4 arrow direction in FIG. 15A.); FIG. 16A and FIG. 16B are a front view, and a sectional view of the mounting substrate, respectively (here, the sectional direction of the sectional view is a C4-C4' arrow direction in FIG. 16A.).

As shown in FIG. 15A to FIG. 15C, the lens 10, like in the example 1, includes the housing concave DH, the pin 11A and the pin 11B to interpose the housing concave DH on the rear surface 10B. Further, in the lens 10, an edge of the rear surface 10B on the pin 11A side is so recessed from the rear surface 10B as to from a step 16 (here, on the rear surface 10B, the step 16 includes: a step lower portion 16L recessed from the rear surface 10B; and a step upper portion 16H that is the rear surface 10B portion other than the step lower portion 16L.).

On the other hand, as shown in FIG. 16A and 16B, the mounting substrate 20 is provided with the holes 21A and 21B into which the pins 11A and 11B of the lens 10 fit, respectively. Further, a partial region of the mount surface 20U surrounding the holes 21A and 21B is so recessed from the rest of the mount surface 20U as to form a recessed portion 26.

The shape of the recessed portion 26, that is, the circumferential shape of the recessed portion 26 of the mount surface 20U is a shape that is slightly larger than and similar to the shape of the step upper portion 16H (first restriction portion/second restriction portion) of the rear surface 10B of the lens 10. Especially, when the holes 21A and 21B fit into the pins 11A and 11B, the recessed portion 26 (second restriction portion/first restriction portion) is substantially aligned with and overlies the step upper portion 16H of the rear surface 10B of the lens 10. Besides, the depth of the recessed portion 26 is substantially the same as the length (in other words, the length of the step 16) that is a height difference between the step upper portion 16H of the rear surface 10B of the lens 10 and the step lower portion 16L.

Here, the holes 21A, 21B have a total length shorter than the holes 21A, 21B in the example 1. A reason for this is that the holes 21A, 21B in the example 4 are formed under the recessed portion 26 that is the concave of the mount surface 20U. Besides, in accordance with the lengths of the holes 21A, 21B in the example 4, also the lengths of the pins 11A, 11B of the lens 10 are shorter than the lengths of the pins 11A, 11B in the example 1 (of course, the pins 11A, 11B have a length that allows the tips of the shank portions 12A, 12B to protrude from the rear surface 20B opposite to the mount surface 20U.).

As described above, the mounting substrate 20 is provided with the recessed portion 26 and the holes 21A, 21B that are situated through the recessed portion 26; accordingly, during the process in which the pins 11A, 11B of the lens 10 are inserted into the holes 21A and 21B, the rear surface 10B of the lens 10 gradually nears the recessed portion 26 and fits into the recessed portion 26.

Because of this, when the pins 11A, 11B are inserted into the holes 21A, 21B; the engagement pieces 13A, 13B hook onto the edges of the holes 21A, 21B; and the lens 10 is mounted onto the mounting substrate 20, as shown in FIG. 14B, the step upper portion 16H of the rear surface 10B of the lens 10 rests on the recessed portion of the mounting substrate 20.

In other words, of the step upper portion 16H (which is sayable to be a foot portion of the lens 10) of the lens 10 and the recessed portion 26 that engage with each other, the recessed portion 26 is formed on the mounting substrate 20, while the step upper portion 16H, which is non-rotation symmetrical and non-point symmetrical thanks to the step 16, is formed on the lens 10. And, the recessed portion 26 and the step upper portion 16H engage with each other by means of the only one way of engagement, thereby restricting the direction (that is, the directivity direction of the lens 10) of the lens 10 to a specific direction. Accordingly, the LED module MJ according to the example 4 achieves the same function and effect as the LED modules MJ according the examples 2, 3.

Here, the step 16 of the lens 10 of the LED module MJ according to the example 4 is aligned with a linear edge of the recessed portion 26; further, a circumferential edge of the step upper portion 16H of the lens 10 is aligned with a curved edge of the recessed portion 26. In other words, thanks to the contact between part of the lens 10 and part of the mounting substrate 20, the direction of the lens 10 is restricted.

However, for the positioning of the lens 10, it is not the mounting substrate 20 only that comes into contact with the lens 10. For example, as shown in FIG. 17A to FIG. 17C, the rivet 33 for mounting the mounting substrate 20 onto the backlight chassis 41 sometimes functions as the positioning member for the lens 10 (here, such LED module MJ is called an example 5.).

Figure 17A:
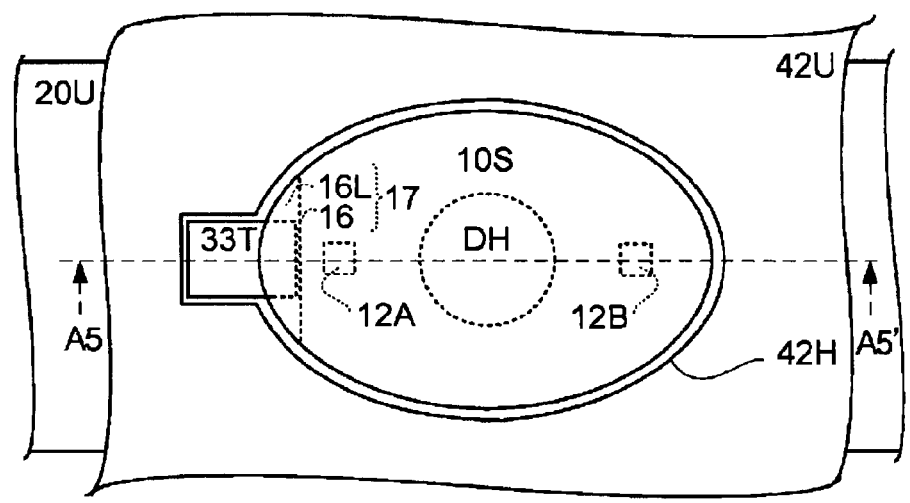
[FIG. 17A] is a front view of an LED module according to an example 5.
Figure 17B:
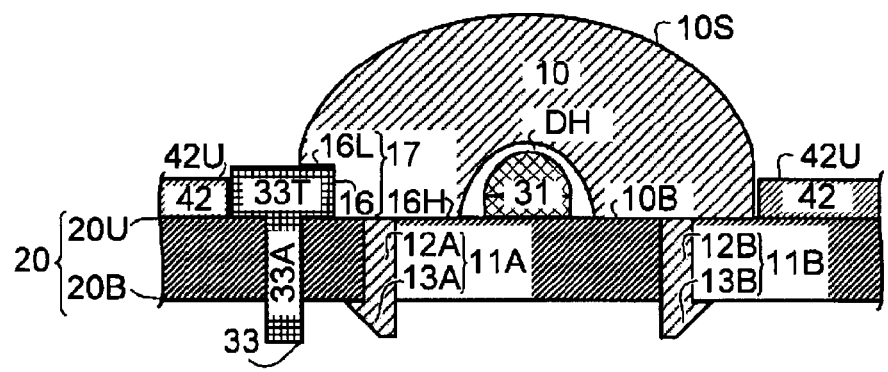
[FIG. 17B] is a sectional view of the LED module according the example 5 (here, the sectional direction of the sectional view is an A5-A5' arrow direction in FIG. 17A.).
Figure 17C:
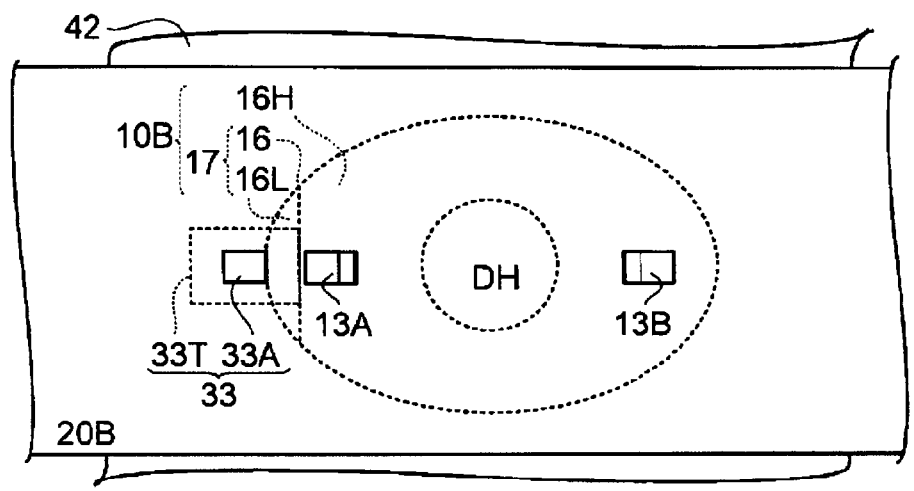
[FIG. 17C] is a rear view of the LED module according to the example 5.

In detail, in the LED module MJ according to the example 5 (EX5), as shown in FIG. 17A to FIG. 17C, the rivet 33, which includes a head 33T formed of a rectangular-shaped plate member and a shank 33A formed of a quadrangular-shaped pole, is inserted from the mount surface 20U of the mounting substrate 20, whereby the mounting substrate 20 and the bottom surface 41B of the backlight chassis 41 are connected to each other (here, in FIG. 17A to FIG. 17C, the backlight chassis 41 is omitted for convenience.).

And, a flat surface of the step 16 of the lesn 10 and a flat surface of the step lower portion 16L are aligned with linear edges of the head 33T of the rivet 33 (here, the step 16 and the step lower portion 16L may be collectively called a step portion 17 (first restriction portion/second restriction portion.)). In other words, instead of the hole 21 formed in the mounting substrate 20, the head 33T, which is part of the rivet (another member) 33 mounted on the mounting substrate 20, engages with the step portion 17 of the lens 10 and performs the same function as the hole 21.

Because of this, the linear edge of the head 33T (second restriction portion/first restriction portion) of the rivet 33 and the step portion 17 of the lens 10 engage with each other by means of the only one way of engagement, thereby restricting the direction (that is, the directivity direction of the lens 10) of the lens 10 to a specific direction. Accordingly, the LED module MJ according to the example 5 achieves the same function and effect as the LED module MJ according the example 4. Besides, compared with forming the hole 21, which is the restriction portion, in the mounting substrate 20, using the rivet 33 which is another member is sometimes able to curb the cost of the LED module MJ.

[Other Embodiments]

Here, the present invention is not limited to the above embodiments, and various modifications are possible without departing from the spirit of the present invention.

For example, in the examples 1 to 3, the mechanism for deciding the direction of the lens 10 is the engagement between the pin 11 of the lens 10 and the hole 21 of the mounting substrate 20 (here, such engagement mechanism between the pin 11 and the hole 21 has an advantage of a simple structure.). However, this is not limiting.

For example, instead of the fitting-in between the pin 11 and the hole 21, the lens 10 may be provided with a rail; the mounting substrate 20 may be provided with a groove into which the rail is fitted; and thanks to the engagement between the rain and the groove, the direction of the lens 10 may be restricted to a specific direction (in short, the connection between the lens 10 and the mounting substrate 20 may be achieved by a slide mechanism in which the rail and the groove are engageable with each other.)).

Besides, the number of pins 11 and the number of holes 21, which decide the position of the lens 10, are three each in the LED module MJ according to the example 1 and two each in the LED module MJ according to the example 2. On the other hand, in the LED module MJ according to the example 3, the number of pins 11 and the number of holes 21, which decide the position of the lens 10, are one each.

Besides, in the LED module MJ according to the example 4, the number of step upper portions 16H of the rear surface 10B of the lens 10 and the number of recessed portions 26 of the mounting substrate 20, which decide the position of the lens 10, are one each. Besides, in the LED module MJ according to the example 5, the number of step portions 17 of the lens 10 and the number of head portions 33T of the rivet 33, which decide the position of the lens 10, are one each.

As described above, to decide the direction of the lens 10, the number of members (e.g., pin 11) of one type and the number of members (e.g., hole 21) of the other type, which engage with each other, may be single or more than one if they are the same in number. According to this, in accordance with necessities of the cost and the like, it is possible to variously change the number and shape of members which engage with each other (in short, in accordance with the cost of the pin 11 and the hole 21 and the like which serve as the restriction portions, the degree of freedom of designing the LED module MJ increases.).

Besides, in the LED modules MJ according to the example 1 to the example 5, the same kind of lenses 10 are used. However, this is not limiting. For example, to obtain a desired brightness distribution of the light (surface light) from the LED module MJ, a plurality of kinds of lenses 10 (e.g., lenses 10 whose lens surfaces 10S are different from each other in surface shape) having directivity direction s different from each other may be mounted on the mounting substrate 20 (however, it is possible to arbitrarily set the directivity direction of the lens 10, accordingly, the number of kinds of the lenses 10 may be relatively small.).

Besides, the pins 11 may be different for the lenses 10 which are different in directivity direction, in accordance with which, the holes 21 of the mounting substrate 20 may be different. In short, when a plurality of kinds of lenses 10, which are different from each other in directivity direction, are used, it is desirable that different kinds of the pins 11 and the like are formed on the lens 10 for different kinds of the lenses 10; and in accordance with each of the different kinds, a different kind of the hole 21 and the like of the mounting substrate 20 are used.

A reason for this is that according to this, mis-mounting (in other words, mis-positioning) of the different kinds of the lenses 10 is solved.

Of course, for example, as in the LED module MJ according to the example 3, the single kind of the pin 11D is used; in accordance with the single kind of the pin 11D, the single kind of the hole 21D is used; and as a result of which, a single kind of combination of the pin 11 and the hole 21D corresponding to each other may be used. In short, when the same kind of the lenses 10 having the same directivity direction are used, the number of kinds of the pins 11 and the like formed on all the lenses 10 may be single; and in accordance with the single kind, the number of kinds of the holes 21 and the like of the mounting substrate 20 may be single (however, the directions of the holes 21 of the mounting substrate 20 are variously different.).

A reason for this is that according to this, only one kind of the lenses 10 are incorporated in the LED module MJ, accordingly, the cost of the LED module MJ is curbed.

Besides, in the above description, the pin 11 is formed on the lens 10 and the hole 21 is formed in or through the mounting substrate 20; however, this is not limiting. For example, the pin 11 may be formed on the mounting substrate 20 and the hole 21 may be formed in or through the lens 10. In short, if the direction of the lens 10 is able to be restricted on the mount surface 20U of the mounting substrate 20, the restriction portions such as the pin 11 and the hole 21, which engage with each other, may be formed on any of the lens 10 and the mounting substrate 20.

Reference Signs List 10 lens
10B rear surface of lens
10S lens surface of lens
DH housing concave
11 pin (one or the other restriction portion, first restriction portion/second restriction portion)
12 shank portion of pin
13 engagement piece of pin
16 step (one or the other restriction portion, first restriction portion/second restriction portion)
16H step upper portion
16L step lower portion (one or the other restriction portion, first restriction portion/second restriction portion)
17 step portion (one or the other restriction portion, first restriction portion/second restriction portion)
20 mounting substrate
20U mount surface
20B rear surface opposite to mount surface
21 hole (one or the other restriction portion, second restriction portion/first restriction portion)
26 recessed portion (one or the other restriction portion, second restriction portion/first restriction portion)
31 LED (light-emitting element)
33 rivet (one or the other restriction portion, second restriction portion/first restriction portion)
41 backlight chassis
41B bottom surface of backlight chassis
42 reflection sheet
43 diffusion plate
44 prism sheet
45 micro-lens sheet
49 backlight unit (illumination device)

59 liquid crystal display panel (display panel)
69 liquid crystal display device (display device)
89 liquid crystal television (television receiver)

The invention claimed is:

1. A light-emitting module comprising:
a light-emitting element;
a mounting substrate on which the light-emitting element is directly mounted; and
a lens mounted directly on the mounting substrate to cover the light-emitting element and arranged to receive light from the light-emitting element and to output most of the light received from the light-emitting element in a deflected direction; wherein
the lens includes a first restriction portion; and
the mounting substrate includes a second restriction portion which is arranged to engage with the first restriction portion only in a single orientation such that the deflected direction is restricted to only one specific direction.

2. The light-emitting module according to claim 1, wherein the first restriction portion has a shape that fits into the second restriction portion.

3. The light-emitting module according to claim 1, wherein
the first restriction portion includes at least one pin; and
the second restriction portion includes at least one hole engaging with the at least one pin.

4. The light-emitting module according to claim 3, wherein a total number of the at least one pin and a total number of the at least one hole is one.

5. The light-emitting module according to claim 3, wherein a total number of the at least one pin and a total number of the at least one hole are same as each other and are more than one.

6. An illumination device comprising the light-emitting module according to claim 1.

7. A display device comprising:
the illumination device according to claim 6; and
a display panel that receives light from the illumination device.

8. The display device according to claim 7, wherein the display panel is a liquid crystal display panel.

9. A television receiver comprising the display device according to claim 7.

10. The illumination device according to claim 6, wherein
the light-emitting module includes a plurality of the light-emitting elements and a plurality of the lenses, each of the plurality of the lenses covers at least one of the plurality of light-emitting elements;
the plurality of the lenses includes first lenses outputting light from the plurality of light-emitting elements covered by the first lens in a first deflected direction, and second lenses outputting light from the plurality of the light-emitting element covered by the second lenses in a second deflected direction which is different from the first deflected direction; and
the first restriction portions of the first lenses are different from the first restriction portions of the second lenses to prevent mis-mounting of the plurality of the lenses.

11. The illumination device according to claim 6, wherein
the light-emitting module includes a plurality of the light-emitting elements and a plurality of the lenses, each of the plurality of the lenses covers at least one of the plurality of the light-emitting elements;
the first restriction portions of each of the plurality of the lenses have a same shape and output light from the plurality of the light-emitting elements respectively covered by each of the plurality of the lenses in a same deflected direction.

12. The light-emitting module according to claim 1, wherein
the first restriction portion includes at least one first step portion; and
the second restriction portion includes at least one second step portion engaging with the at least one first step portion.

13. The light-emitting module according to claim 12, wherein
the at least one second step portion is defined by a rivet arranged on the mounting substrate.

* * * * *